(12) United States Patent
Itahara et al.

(10) Patent No.: US 7,460,500 B2
(45) Date of Patent: Dec. 2, 2008

(54) MULTICARRIER TRANSMISSION METHOD AND APPARATUS

(75) Inventors: Hiroshi Itahara, Yokohama (JP); Yuichi Hagiwara, Yokohama (JP)

(73) Assignee: Panasonic Corporation, Osaka (JP)

( * ) Notice: Subject to any disclaimer, the term of this patent is extended or adjusted under 35 U.S.C. 154(b) by 723 days.

(21) Appl. No.: 11/169,705

(22) Filed: Jun. 30, 2005

(65) Prior Publication Data

US 2005/0243909 A1 Nov. 3, 2005

Related U.S. Application Data

(62) Division of application No. 10/623,811, filed on Jul. 22, 2003, now Pat. No. 6,982,965.

(30) Foreign Application Priority Data

Jul. 31, 2002 (JP) ............................. 2002-224221

(51) Int. Cl.
*H04B 7/185* (2006.01)
(52) U.S. Cl. ..................... 370/317; 375/296; 455/116
(58) Field of Classification Search ................. None
See application file for complete search history.

(56) References Cited

U.S. PATENT DOCUMENTS

| | | | |
|---|---|---|---|
| 5,093,840 A | 3/1992 | Schilling | |
| 5,107,225 A | 4/1992 | Wheatley, III et al. | |
| 5,125,100 A | 6/1992 | Katznelson | |
| 5,357,541 A | 10/1994 | Cowart | |
| 5,751,705 A | 5/1998 | Sato | |
| 5,790,555 A | 8/1998 | Narahashi et al. | |
| 5,799,010 A | 8/1998 | Lomp et al. | |
| 5,991,329 A | 11/1999 | Lomp et al. | |
| 6,188,732 B1 | 2/2001 | Rha | |
| 6,307,892 B1 | 10/2001 | Jones et al. | |
| 6,430,213 B1 | 8/2002 | Dafesh | |
| 6,654,427 B1* | 11/2003 | Ma et al. | 375/297 |
| 7,061,991 B2* | 6/2006 | Wright et al. | 375/296 |
| 7,170,952 B2* | 1/2007 | Hunton | 375/296 |
| 2001/0000456 A1 | 4/2001 | McGowan | |
| 2002/0006157 A1 | 1/2002 | Hunton | |
| 2002/0012403 A1 | 1/2002 | McGowan et al. | |

(Continued)

FOREIGN PATENT DOCUMENTS

EP 0735731 10/1996

(Continued)

OTHER PUBLICATIONS

Partial European Search Report dated Sep. 28, 2006.

*Primary Examiner*—Phirin Sam
(74) *Attorney, Agent, or Firm*—Dickinson Wright, P.L.L.C.

(57) ABSTRACT

A multicarrier transmission apparatus that achieves both power efficiency in a high-frequency amplifier and quality of transmission signal in a radio transmission system in next-generation mobile communications that supports high speed data packet transmission. In the apparatus, adaptive peak limiter 400 performs adaptive hard limit processing on baseband signals of frequency channels passed through multiplexing sections 200a to 200d for users, multicarrier signal generating circuit 500 with peak suppressing function performs peak limit processing on a synthesized multicarrier signal, hybrid distortion compensating circuit 700 corrects non-linear distortion due to high-frequency amplifier 32, and the multicarrier signal is transmitted from an antenna (ANT).

6 Claims, 23 Drawing Sheets

| U.S. PATENT DOCUMENTS | | | FOREIGN PATENT DOCUMENTS | | |
|---|---|---|---|---|---|
| 2002/0061068 A1 | 5/2002 | Leva et al. | EP | 0993136 | 4/2000 |
| 2002/0101935 A1 | 8/2002 | Wright et al. | JP | 08274734 | 10/1996 |
| 2002/0101936 A1 | 8/2002 | Wright et al. | JP | 09018451 | 1/1997 |
| 2002/0118729 A1 | 8/2002 | Lomp et al. | JP | 11313042 | 11/1999 |
| 2003/0012292 A1 | 1/2003 | Hunton | JP | 2001268050 | 9/2001 |
| 2003/0063685 A1 | 4/2003 | Yoshida | JP | 2002044054 | 2/2002 |
| 2003/0086507 A1 | 5/2003 | Kim et al. | JP | 2002164799 | 6/2002 |
| 2004/0042387 A1 * | 3/2004 | Geile ......................... 370/206 | * cited by examiner | | |

A : hold-num = 2   C : hold-num = 3
B : hold-num = 0

| PEAK VALUE | QUALITY OF TRANSMISSION SIGNAL |
|---|---|
| P2 | GOOD |
| P1 | NORMAL |
| P0 | DETERIORATION |

| INDEX | DP1 | DP2 | DP3 | DP4 | F1 | F2 | F3 | F4 | P0 | P1 | P2 | P4 | |
|-------|-----|-----|-----|-----|----|----|----|----|----|----|----|-----|---|
| 14    | 0   | 0   | 0   | 0   | 0  | 0  | 0  | 0  | L3 | L3 | L3 | NONE | ① |
| 15    | 0   | 0   | 0   | 0   | 1  | 1  | 1  | 1  | L1 | L1 | L1 | L1  | ② |
| 31    | 0   | 0   | 0   | 1   | 1  | 1  | 1  | 1  | L1 | L1 | L1 | L2  | ③ |
| 142   | 1   | 0   | 0   | 0   | 0  | 1  | 1  | 0  | L4 | L3 | L3 | NONE | ④ |
| 143   | 1   | 0   | 0   | 0   | 1  | 1  | 1  | 1  | L2 | L1 | L1 | L1  | ⑤ |
| 207   | 1   | 1   | 0   | 0   | 1  | 1  | 1  | 1  | L2 | L2 | L1 | L1  | ⑥ |
| 255   | 1   | 1   | 1   | 1   | 1  | 1  | 1  | 1  | L2 | L2 | L2 | L2  | ⑦ |

$L2 > L1$, $L3 = L1 \times (4/\Sigma Fn)^{1/2}$, $L4 = L2 \times (4/\Sigma Fn)^{1/2}$ SITUATION
① : A SINGLE FREQUENCY CHANNEL IS UNUSED (OFF)   ALL CHANNELS DO NOT USE HSDPA
② : ALL FREQUENCY CHANNELS ARE USED (ON)         ALL CHANNELS DO NOT USE HSDPA
③ : A SINGLE FREQUENCY CHANNEL IS USED (ON)      ONE CHANNEL USES HSDPA
④ : A SINGLE FREQUENCY CHANNEL IS UNUSED (OFF)   ONE CHANNEL USES HSDPA
⑤ : ALL FREQUENCY CHANNELS ARE USED (ON)         ONE CHANNEL USES HSDPA
⑥ : ALL FREQUENCY CHANNELS ARE USED (ON)         TWO CHANNELS USE HSDPA
⑦ : ALL FREQUENCY CHANNELS ARE USED (ON)         ALL CHANNELS USE HSDPA

FIG.16

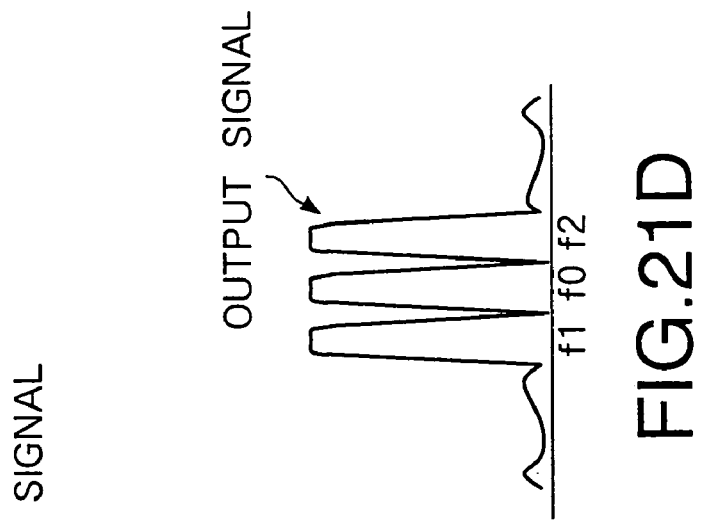
FIG.21D
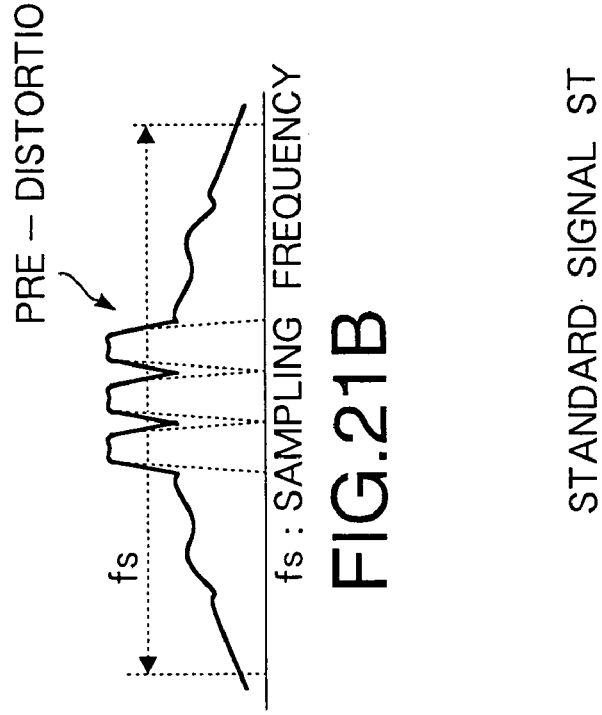
FIG.21B
FIG.21C
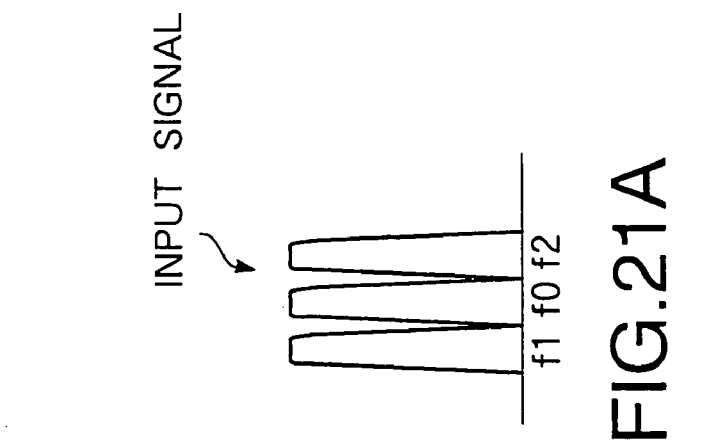
FIG.21A

MULTICARRIER TRANSMISSION METHOD AND APPARATUS

This is a divisional of application Ser. No. 10/623,811 filed Jul. 22, 2003.

BACKGROUND OF THE INVENTION

1. Field of the Invention

The present invention relates to a multicarrier transmission method and apparatus, and more particularly, to a method of suppressing a peak of a multicarrier transmitted signal, multicarrier transmission signal generating circuit with peak suppressing function, adaptive peak limiter, baseband signal processing LSI and multicarrier transmission apparatus.

2. Description of Related Art

In the field of mobile communications, for example, with respect to technical specifications in the W-CDMA (Wideband-Code Division Multiple Access) system, 3GPP has standardized. In the technical specifications, in addition to basic reception techniques (for example, Rake combining) that take advantages of CDMA, High Speed Downlink Packet Access (hereinafter, also abbreviated as HSDPA) with a faster rate of 10 Mbps has been also standardized.

HSDPA is a technique where a plurality of users that perform downlink packet transmission shares a downlink channel, radio channel quality of each user is checked, and optimal base stations transmit signals to respective users, thus improving the transmission efficiency. Using the technique achieves a transmission rate of 10 Mbps using a frequency bandwidth of 5 MHz.

Among specific techniques used in HSDPA are adaptive modulation that is a scheme for varying a modulation scheme and coding scheme corresponding to propagation environments and using M-ary modulation such as 16 QAM and 64 QAM suitable for large-capacity transmission, HARQ (Hybrid ARQ) that synthesizes a retransmission signal to improve the reception quality, and FCS (Fast Cell Selection) that achieves efficient packet transmission from a plurality of base stations.

In adaptive modulation, a base station transmits signals with M-ary modulation such as 16 QAM and 64 QAM and high-rate coding with a coding rate of, for example, ¾ when the reception quality in a mobile station is good, while transmitting signals with QPSK and low-rate coding with a coding rate of, for example, ¼ when the reception quality in a mobile station is poor.

In HSDPA, since QAM is used as a modulation scheme, with respect to signal quality in a band (Peak Code Domain Error (PCDE) and Error Vector Magnitude (EVM)), it is mandatory to comply with performance standard (TS25.141 Rel. 5) stricter than performance standard (TS25.141 Rel. 99) for general third-generation base station apparatus.

Meanwhile, the CDMA system has a significant feature of implementing concurrent communications by multiplexing user signals. For example, it is assumed that a frequency band assigned to a company permitted to locate base stations includes four channels (with carrier frequencies f1 to f4 respectively).

In this case, data of a plurality of users is multiplexed on one channel, and signals of the channels are transmitted at the same time from a shared antenna. In other words, four carriers, f1 to f4, are concurrently transmitted (multicarrier transmission).

When the multicarrier transmission is performed, a high-frequency amplifier provided at a last stage of a transmitter undergoes a heave load, and is required to secure the linearity in a wide band.

In order to reduce the load on the high-frequency amplifier, using a peak limiter, the processing for suppressing an instantaneous peak is performed on a baseband signal for multicarrier transmission.

The peak limiter is described in, for example, Japan Laid-Open Patent Publication Nos. 2002-164799 and 2002-44054.

However, conventional techniques related to the peak limiter have no consideration on High Speed Downlink Packet Access (HSDPA).

HSDPA is an advanced technique with a considerable amount of difficulty to practically implement, in any theory.

Further, as described above, since QAM is used as a modulation scheme, with respect -to signal quality in a band (PCDE and EVM), HSDPA needs to meet performance standard (TS25.141 Rel.5) stricter than performance standard (TS25.141 Rel.99) for general third-generation base station apparatus.

In mobile communication apparatuses such as cellular telephones, there have been severe demands always for cost reduction, miniaturization and low power consumption.

It is difficult for conventional techniques to implement HSDPA under various constrains imposed on mobile communication apparatuses.

For example, in HSDPA, the modulation scheme is varied corresponding to the channel quality. In this case, when characteristics of a peak limiter are adapted to 64 QAM with the strictest conditions as a reference and peak suppression is reduced, since the suppression on an instantaneous peak is not sufficient, and as a result, the load on a high-frequency amplifier in a subsequent stage is increased and the power efficiency in the high-frequency amplifier deteriorates. Meanwhile, when the peak suppression is enhanced, a signal loss degrades the signal quality.

In order to solve the problem, it is necessary to use an amplifier with high performance that secures the linearity in an extremely wide range. However, such a high-frequency amplifier is expensive, and becomes a significant obstacle in cost.

The problem is described above referring to W-CDMA communications as an example, but there is a possibility such a problem occurs in other communication systems (such as other CDMA systems) that perform high-speed packet transmission.

SUMMARY OF THE INVENTION

It is an object of the present invention to provide a multicarrier transmission method and apparatus that take realistic measures on techniques of limiting a peak and compensating for a distortion of a transmission signal, while clearing up strict constrains imposed on mobile communication apparatuses, and enable desired characteristics of the transmission signal to be achieved.

According to an aspect of the invention, a method of suppressing a peak of a multicarrier transmission signal, in a transmission system where filtering processing is performed on each of baseband signals respectively corresponding to a plurality of frequency channels using a filter, the signals subjected to the filtering processing are each multiplied by a predetermined carrier to be single-carrier signals, and the single-carrier signals are combined to obtain a multicarrier transmission signal, has the steps of branching each of the baseband signals from a regular signal processing route, performing filtering processing on each of the baseband signals branched, multiplying each of the baseband signals branched by the same carrier as the predetermined carrier at the same timing as in multiplication by the predetermined carrier, combining the signals obtained, and thereby obtaining a multicarrier signal for use in calculating a correction value for peak suppression, detecting an instantaneous peak of the multicarrier signal for use in calculating the correction value, and based on the detection result, obtaining the correction value for peak suppression, and multiplying each of the baseband signals on the regular signal processing route by the correction value to perform correction for peak suppression.

In other words, in the method of suppressing a peak of a multicarrier transmission signal of the present invention, a single-carrier signal is synthesized obtained by performing the same processing under the same condition as in the processing in the regular signal route, the same multicarrier signal as the regular multicarrier signal is obtained, a correction value is calculated based on the obtained signal, and using the correction value, an amplitude value of a baseband signal of each frequency channel is corrected.

Such a method is equivalent to accurately predicting an instantaneous peak that will occur in synthesizing a single-carrier signal, and correcting the amplitude of a baseband signal in advance so as to keep the instantaneous peak within a desired level. In this way, it is possible to perform a method of suppressing a peak with extremely high reliability that has not been obtained before.

Further, in an aspect of the method of suppressing a peak of a multicarrier transmission signal of the present invention, even when the peak of a baseband signal decreases continuously, the correction value is calculated using a high peak value obtained before the peak starts decreasing in a predetermined number of times, enabling severer peak limitation.

Thus, it is possible to perform adaptive control with more importance placed on peak suppression than signal quality, rather than mere adaptive control. In other words, in any cases, it is possible to suppress an amplitude value of a multicarrier signal (combined transmission single-carrier signals) to be below a desired level. Accordingly, the load on a high-frequency amplifier disposed subsequently is always reduced.

According to another aspect of the invention, a multicarrier transmission signal generating circuit with peak suppressing function has a regular signal processing route for branching each of baseband signals corresponding to each of frequency channels to multicarrier-transmit to two signal sequences, delaying each of baseband signals in one signal sequence in a delayer, multiplying each of the signals by a correction value for peak suppress in a multiplier, performing n-time (n is an integer of two or more) interpolation processing on each of the signals multiplied by the correction value, performing filtering processing on the signals using a filter, multiplying each of the signals by a carrier to obtain single-carrier signals, and combining the single-carrier signals to output a multicarrier transmission signal, and a correction value generating route for performing on each of baseband signals in the other signal sequence substantially the same processing at substantially the same timing as the n-time interpolation processing, the filtering processing, and processing of multiplying by the carrier to obtain a single-carrier signal in the regular signal processing route, thereby obtaining a multicarrier signal for use in calculating the correction value, detecting an instantaneous peak of the multicarrier signal for use in calculating the correction value, and obtaining the correction value for peak suppression based on the detection value to provide to the multiplier in the regular signal processing route.

In other words, in the multicarrier transmission signal generating circuit with peak suppressing function of the present invention, an instantaneous peak is detected based on a multicarrier signal synthesized through a route with the completely same conditions as in the regular multicarrier synthesis route to calculate the correction value for peak suppression, and it is thereby possible to perform extremely accurate peak suppressing correction.

According to still another aspect of the invention, an adaptive peak limiter has a plurality of hard limiters which is provided respectively for a plurality of frequency channels having a possibility of containing communication data to which a predetermined data packet transmission scheme is applied, and limits an amplitude value of a baseband signal of each of the frequency channels using an adaptive limit value provided from outside, and a limit value table to which access is made using, as an address variable, on/off bit information indicative of whether the predetermined data packet transmission scheme is applied and another on/off bit information indicative of whether each of the frequency channel is used, both the information being reported from an upper layer for each of the frequency channels, and which outputs an adaptive limit value as a result of the access to provide to at least one of the plurality of hard limiters.

In other words, the adaptive peak limiter of the present invention is a new peak limiter contributing to implementation of, for example, High Speed Downlink Packet Access (HSDPA) supported by 3.5-Generation Mobile Communications.

The adaptive peak limiter of the present invention has a plurality of hard limiters which is provided respectively for frequency channels and whose limit values are updated adaptively. The "hard limiter" is a limiter with the capability of clamping a peak value of a signal in a predetermined value precisely.

In an aspect of the adaptive peak limiter of the invention, as address information, using on/off information indicative of whether or not each frequency channel is used and another on/off information indicative of whether or not HSDPA is applied to chip data of each frequency channel notified from an upper layer (for example, a baseband processing board in a base station control section) on a chip basis of a baseband signal corresponding to each frequency channel in multicarrier transmission, the limit value table is accessed to output a limit value adaptively, and a clamp value of the hard limier is thereby adjusted finely on a chip basis.

That is, concurrently transmitting signals of a plurality of frequency channels does not include using all the frequency channels always, and even when a chip of a transmission signal of a frequency channel is chip data using HSDPA (using QAM as a modulation scheme), chip data of the other frequency channels to concurrently transmit does not use HSDPA always (in other words, QPSK may be used as a modulation scheme).

With attention attracted to this respect in the present invention, the adaptive control is performed such that on a chip to which a modulation scheme with severe demodulation condition such as 16 QAM is applied with frequency channel ON, the adaptive control with relieved suppression on amplitude value and importance placed on signal quality is performed, while when a frequency channel is OFF or on a chip to which HSDPA is not applied, adaptive control with enhanced suppression on limit value and importance placed on peak suppression is performed.

Thus, in response to a state of each frequency channel, by distinguishing chip data in which importance should be placed on amplitude suppression and chip data in which importance should be placed on signal quality from one another, it is possible to perform adaptive fine adjustment so as to provide more energy to the chip data with importance placed on signal quality. Accordingly, in the case where data to multicarrier-transmit includes transmission data using HSDPA, it is possible to assure desired signal quality specified in specifications of 3GPP.

According to a further aspect of the invention, a baseband signal processing LSI has a configuration where respective signals of frequency channels output from the adaptive peak limiter as described above are input to the multicarrier transmission signal generating circuit with peak suppressing function as described above, thereby generating a multicarrier transmission signal subjected to peak suppressing processing such that a PAR (Peak to Average Ratio) value and a CCDF (Complementary Cumulative Distribution Function) remain within respective desired allowable ranges.

That is, the baseband signal processing LSI of the present invention uses the adaptive peak limiter of the invention and the multicarrier transmission signal generating circuit with peak suppressing function of the present invention in a combination thereof.

In other words, peak limit processing is carried out in the multicarrier transmission signal generating circuit with peak suppressing function so that a PAR (Peak to Average Ratio) value and a CCDF (Complementary Cumulative Distribution Function) of a multicarrier signal always remain within respective desired allowable ranges (which assures that the total energy of the transmission signal always remains within a predetermined range), while using the peak limiter, a limit value is adaptively controlled for each frequency channel, and fine adjustment on distribution of transmission energy is carried out in response to a state of each frequency channel.

In this way, extremely efficient (rational) adaptive peak limit processing is achieved in consideration of both the entire state of multicarrier signal and state of each frequency channel. Therefore, with respect to a plurality of frequency channels having a possibility of containing communication data to which applied is a high speed data packet transmission scheme (such as HSDPA) conforming to IMT2000, reliable and effective peak suppression is implemented such that the PAR value and CCDF of a multicarrier transmission signal are kept within respective desired allowable ranges to reduce the load on a high-frequency amplifier subsequently disposed, while with respect to each frequency channel, adaptive peak control as possible is performed to prevent signal quality from deteriorating.

According to the present invention, it is possible to achieve latest mobile communications. For example, it is possible to achieve W-CDMA multicarrier transmission apparatuses in compliance with 3.5-Generation Mobile Communications supporting the HSDPA scheme.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 16 is a view to explain the association between ROM address and ROM data;

FIG. 21A is a view showing an example of a frequency spectrum of a multicarrier transmission signal to input to the hybrid distortion compensating circuit;

FIG. 21B is a view showing an example of a frequency spectrum of a signal subjected to pre-distortion processing;

FIG. 21C is a view showing an example of a frequency spectrum of a standard signal to input to a feedforward distortion compensating circuit;

FIG. 21D is a view showing an example of a frequency spectrum of a multicarrier transmission signal output from the hybrid distortion compensating circuit.

DETAILED DESCRIPTION OF THE PREFERRED EMBODIMENT

An embodiment of the present invention will be described below specifically with reference to accompanying drawings.

Figure 1A:
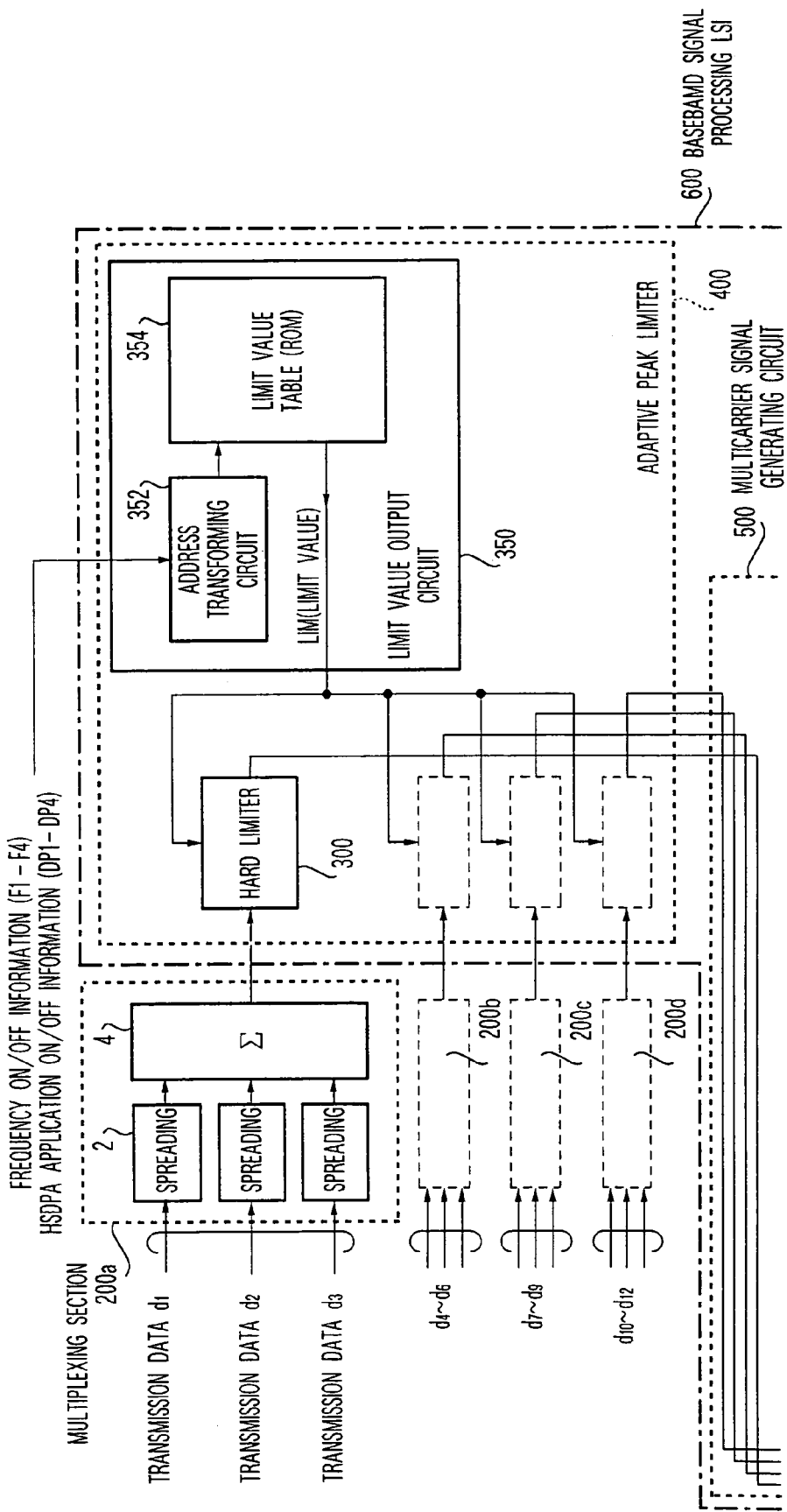
FIG. 1A is a block diagram illustrating part of an entire configuration of a multicarrier transmission apparatus according to one embodiment of the present invention.
Figure 1B:
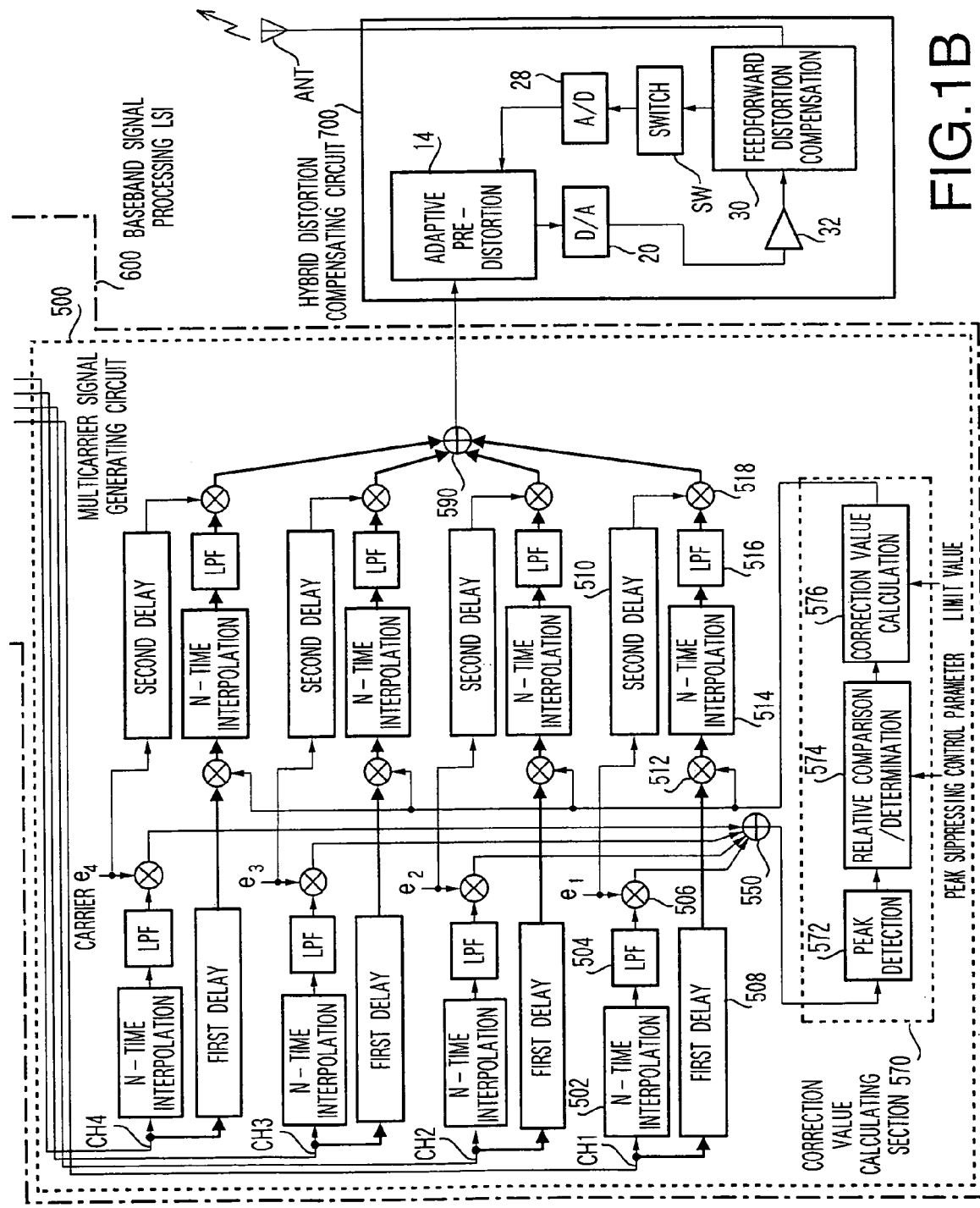
FIG. 1B is a block diagram illustrating remaining part of the entire configuration of the multicarrier transmission apparatus according to the present embodiment.

FIGS. 1A and 1B are block diagrams illustrating an entire configuration of a multicarrier transmission apparatus according to one embodiment of the present invention. The multicarrier transmission apparatus is a W-CDMA radio transmission apparatus (radio base station apparatus) that uses an adaptive peak limiter and multicarrier signal generating circuit each according to the present invention further in a combination with a hybrid distortion compensating circuit that performs distortion compensation with high precision.

In the figure, baseband signal processing section (baseband signal processing LSI) 600 is indicated by alternate long and short dashed lines.

Adaptive peak limiter 400 and multicarrier signal generating circuit 500 with peak suppressing function are both indicated by dotted bold lines.

As shown in the figure, hybrid distortion compensating circuit 700 has a configuration with a combination of adaptive pre-distortion section 14 and feedforward distortion compensating section 30. As other structural elements, the circuit 700 has D/A converter 20, A/D converter 28, switching circuit SW and high-frequency amplifier 32.

The following description is given, assuming that an antenna is capable of transmitting signals of four frequency channels at the same time.

As described at upper left in FIG. 1A, transmission data d1 to d3 is multiplexed on frequency channel CH1, and similarly, transmission data d4 to d6, d7 to d9 and d10 to d12 is respectively multiplexed on frequency channels CH2 to CH4.

Multiplexing sections 200a to 200d of user signal are provided respectively for frequency channels CH1 to CH4, and each has a plurality of spreading sections 2 and multiplexing circuit 4 that multiplexes spread user signals.

Adaptive peak limiter 400 has hard limiters 300 provided for each frequency channel and limit value output circuit 350. Limit value output circuit 350 has address transforming circuit 352 and limit value table (ROM) 354.

Address transforming circuit 352 transforms on/off information (F1 to F4) indicative of whether or not a respective frequency channel is used and another on/off information (DP1 to DP4) indicative of whether or not HSDPA is applied to chip data on the respective frequency channel notified on a chip basis from an upper layer (for example, a baseband processing board of a base station control section, not shown) to addresses for use in referring to ROM, and accesses to limit value table (ROM) 354 to cause adaptive limit value LIM to be output.

Adaptive peak limiter 400 will be described specifically later with reference to FIGS. 13 to 17.

Multicarrier signal generating circuit 500 with peak suppressing function performs n-time interpolation (n is an integer of two or more) and orthogonal modulation (by multiplying by respective one of orthogonal carriers e1 to e4 to obtain single-carrier signals) on four frequency channels, CH1 to CH4, and combines the single-carrier signals to generate a multicarrier transmission signal, while generating the same multicarrier signals as the above multicarrier signal in a route different from a regular signal processing route, calculating a correction value to correct an instantaneous peak based on the multicarrier signal, sending back the correction value to the regular signal processing route, and subjecting peak suppressing processing on a baseband signal to a baseband signal of each of the frequency channels.

In addition, a baseband signal of each of frequency channels CH1 to CH4 is composed of two signals, I (in-phase) signal and Q (quadrature) signal, but for convenience in drawing, is indicated by a single signal line.

Since a configuration of circuitry for performing n-time interpolation and orthogonal modulation is the same as in each frequency channel, the description is given on frequency channel CH1.

The circuitry for performing n-time interpolation and orthogonal modulation has a route for synthesizing a multi-carrier signal to be a base to calculate a peak correction value, calculates the correction value based on the signal to provide to the regular signal processing route(indicated by bold lines in the figure), in addition to the regular signal processing route.

The regular signal processing route (indicated by bold lines in the figure) has first delay circuit 508, multiplier 512 to multiply by a correction value, n-time interpolation circuit 514, low-pass filter (LPF) 516 to limit a band of a signal, multiplier 518 for orthogonal modulation, and combiner 590 that combines single-carrier signals passed through multiplier 518. First delay circuit 508 delays a signal by a time required for calculating the correction value and a time corresponding to a group delay of LPF 504. N-time interpolation circuit 514 performs interpolation for the need of increasing a clock frequency so as to perform signal processing for a predetermined wide frequency band.

The orthogonal modulation is achieved by multiplying each of I and Q signals of each channel by the carrier e1 (to e4).

For example, in the orthogonal modulation, when frequency channels to use are CH1 (carrier frequency f1) and CH2 (carrier frequency f2) and a frequency for frequency shift is fc, a signal to transmit with the carrier frequency f1 is multiplied by a carrier of f1-fc, while multiplying a signal to transmit with the carrier frequency f2 by a carrier of f2-fc, to perform orthogonal modulation.

The multiplication by the carrier e1 (to e4) is performed in the same way as in the signal processing route for calculating the correction value. Accordingly, in the circuit in FIGS. 1A and 1B, a signal is multiplied by the carrier e1 (to e4) in the signal processing route for calculating the correction value, is delayed by a time required for calculating the correction value and a time corresponding to a group delay of low-pass filter (LPF) 516, and is subjected to orthogonal modulation in the regular signal processing route.

Meanwhile, in the circuit in FIGS. 1A and 1B, a signal route for synthesizing a multicarrier signal as a base for calculating the correction value is provided separately from the regular signal process in groute. The signal processing route has n-time interpolation circuit 502, low-pass filter (LPF) 504, multiplier 506 and combiner 550. A configuration of such a signal route and conditions such as signal processing timing in the route are completely the same as in the regular signal processing route.

Correction value calculating section 570 that calculates a peak correction value based on the synthesized multicarrier signal has peak detecting section 572, relative comparison/determination section 574 and correction value calculating section 576.

A peak suppressing control parameter is provided to relative comparison/determination section 574 from the outside, and it is thereby possible to adjust finely the peak suppressing capability depending on the relative level of importance between the signal quality and peak suppression.

A peak limit value is provided to correction value calculating section 576 from the outside.

A correction value output from correction value calculating section 576 is multiplied by a baseband signal in multiplier 512 in the regular signal processing route to correct the amplitude.

Thus generated multicarrier signal undergoes distortion compensation in hybrid distortion compensating circuit 700, and then is transmitted to a plurality of mobile terminals (not shown) through an antenna (ANT) of the base station apparatus.

The frequency band of a spectrum emission mask specified in 3GPP TS 25.104 is an extremely wide band that covers about 1 GHz between the upper and lower sides with a band of a transmission signal as a center. Since it is completely impossible for a general pre-distortion circuit to remove distortion components of the high orders occurring in such a wide band, using hybrid distortion compensating circuit 700 enables responses to such strict specifications.

It is thereby possible to achieve 3.5-Generation W-CDMA Mobile Communications that supports HSDPA.

The multicarrier signal generating circuit with peak suppressing function, adaptive peak limiter and hybrid distortion compensating circuit will be described specifically below sequentially.

Figure 2:
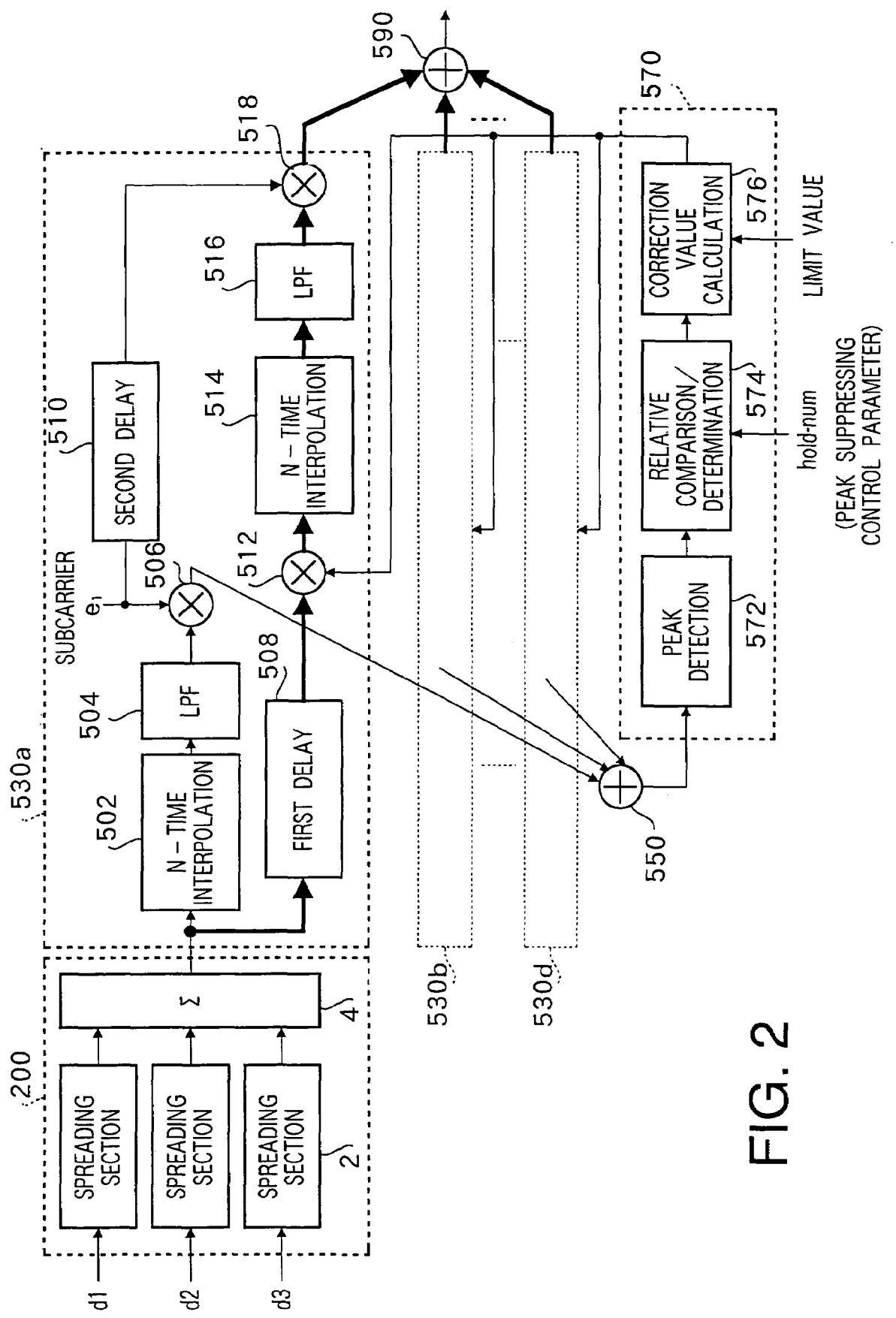
FIG. 2 is a block diagram illustrating one example of a configuration of a multicarrier signal generating circuit with peak suppressing function of the present invention.

FIG. 2 is a block diagram illustrating a configuration of the multicarrier signal generating circuit with peak suppressing function. The multicarrier signal generating circuit has the same configuration as circuit 500 as shown in FIG. 1B.

In FIG. 2, reference numerals 530$a$ to 530$d$ are circuits each for performing orthogonal modulation on a baseband signal subjected to amplitude correction to be a single-carrier signal.

Correction value calculating circuit 570 calculates a correction value based on a multicarrier signal synthesized through completely the same processing as in the regular signal processing route.

Thus, single-carrier signals are actually combined, an instantaneous peak of the actual multicarrier signal is detected (in peak detecting section 572), and a correction value to suppress the peak to be below a desired level is calculated, whereby it is possible to assuredly suppress the peak of the multicarrier signal to be within a desired level.

Figure 3:
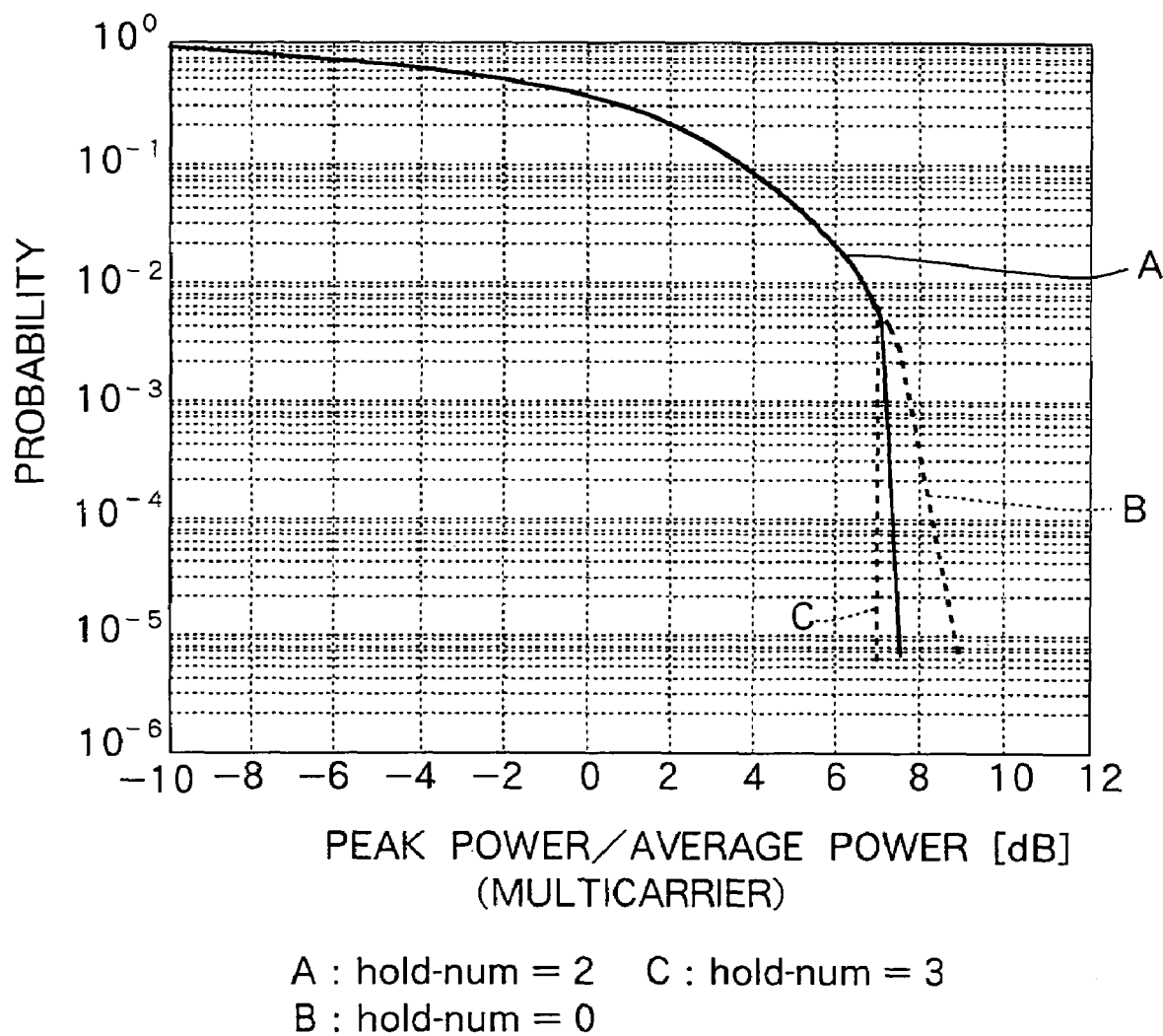
FIG. 3 is a graph showing CCDF (Complementary Cumulative Distribution Function) of a multicarrier transmission signal generated in the circuit in FIG. 2.

FIG. 3 is a graph of CCDF (Complementary Cumulative Distribution Function) indicative of the relationship between a ratio (horizontal axis) of peak power to average power of a multicarrier transmission signal generated in the multicarrier signal generating circuit with peak suppressing function in FIG. 2 and probability (vertical axis).

In the figure, it is understood that a considerably abrupt peak limit is possible like characteristic line A indicated by solid lines. The characteristic line A is of peak suppressing control parameter (hold-num) of two.

In the figure, characteristic line B is of peak suppressing control parameter (hold-num) of zero, and characteristic line C is of peak suppressing control parameter (hold-num) of three.

From FIG. 3, it is understood that using a peak suppressing control parameter (hold-num) provided to relative comparison/determination section 574 from the outside enables adjustment of peak suppressing characteristics.

Figure 4:
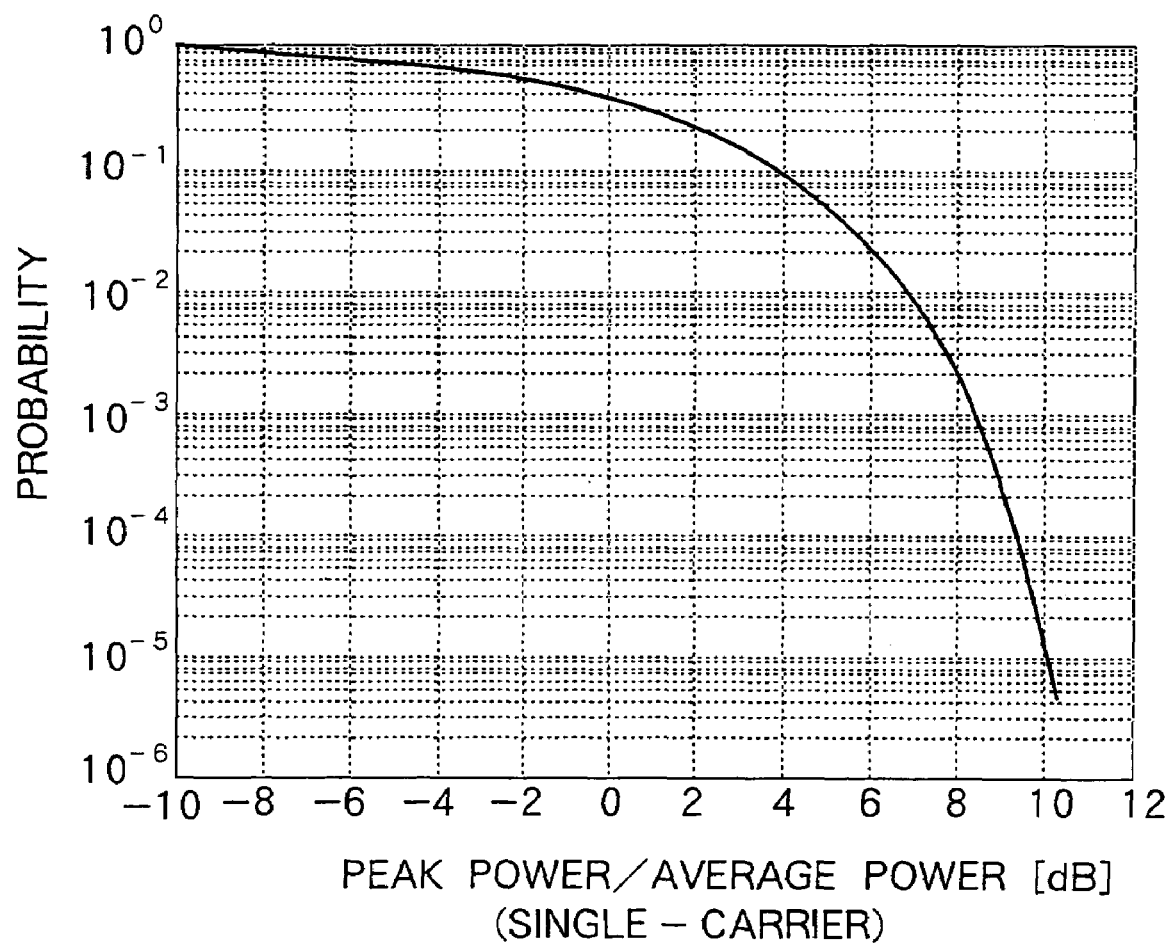
FIG. 4 is a graph showing characteristics of each single-carrier signal prior to multicarrier synthesis in the circuit in FIG. 2.

FIG. 4 is a graph showing characteristics of each single-carrier signal prior to multicarrier synthesis in the multicarrier signal generating circuit with peak suppressing function in FIG. 2.

Figure 7A:
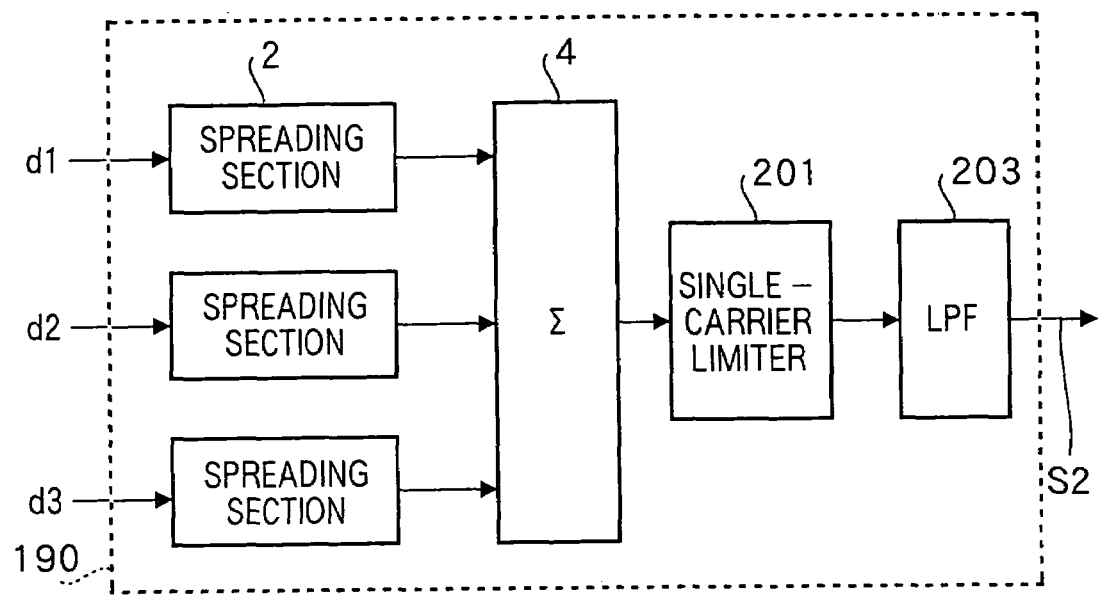
FIG. 7A is a block diagram illustrating a configuration of a conventional peak limit circuit that performs limit processing on a single-carrier signal.
Figure 7B:
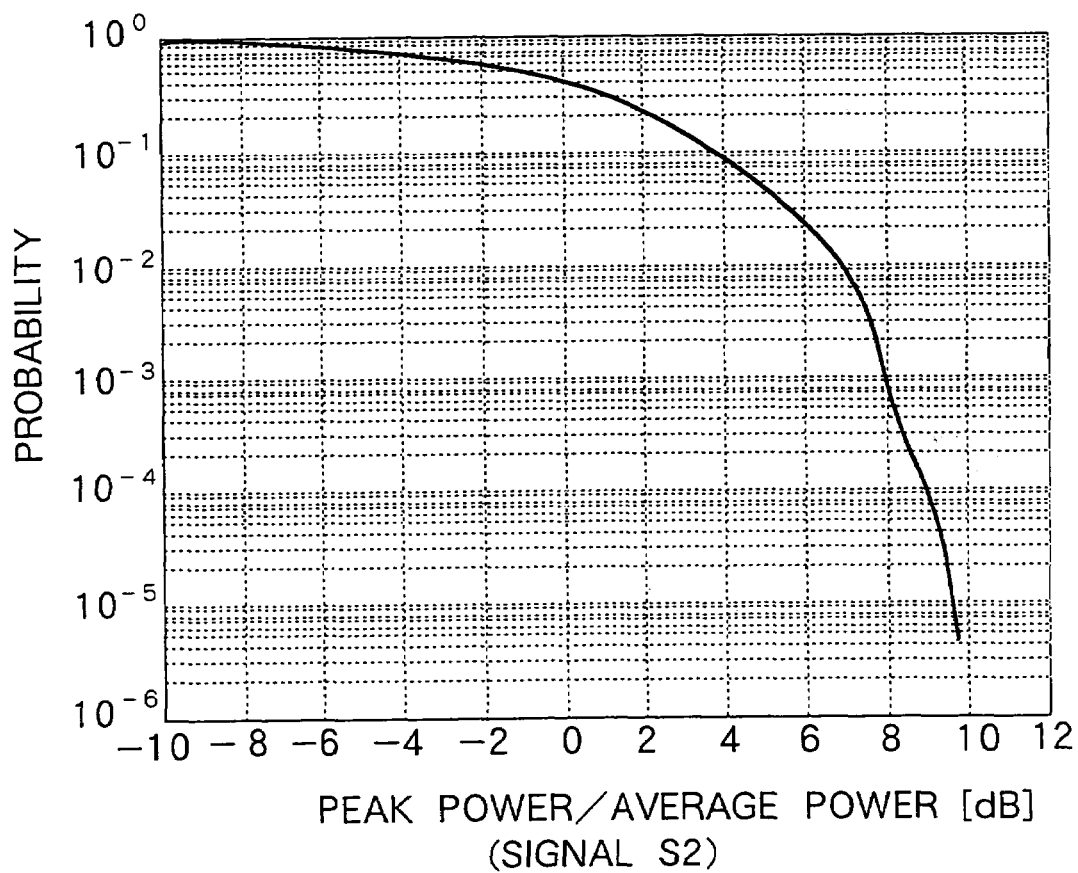
FIG. 7B is a graph showing CCDF characteristics of a single-carrier signal (subjected to peak suppression and filtering by a low-pass filter) in the circuit in FIG. 7A.

Herein, FIG. 7B is a graph showing characteristics of a signal subjected to peak suppression in the conventional circuit for suppressing a peak of a singe-carrier signal as shown in FIG. 7A. By comparing FIG. 4 with FIG. 7B, it is understood that the circuit in FIG. 2 does not perform extremely strict carrier suppression on a single-carrier signal.

In other words, in the circuit in FIG. 2, as shown in FIG. 3, the multicarrier signal undergoes the peak limit to a high extent, and in any circumstances, the instantaneous peak of a multicarrier is assured to be kept within a predetermined range, while in terms of single-carrier signal, excessive peak limit is not performed, and accordingly, quality of the transmission signal is affected a little.

Figure 5A:
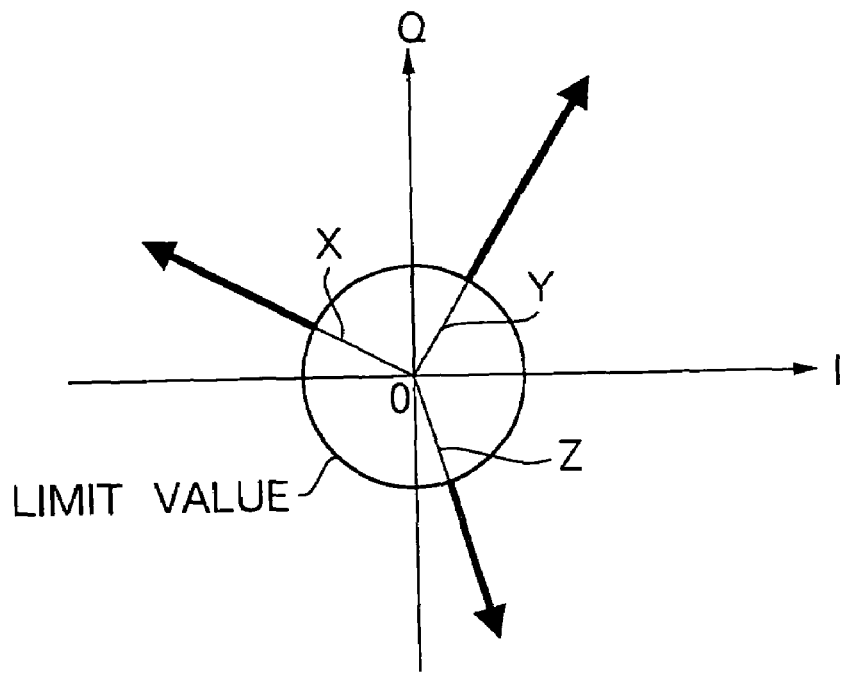
FIG. 5A is a view to explain an issue in the case of performing peak suppressing processing on a single-carrier signal.
Figure 5B:
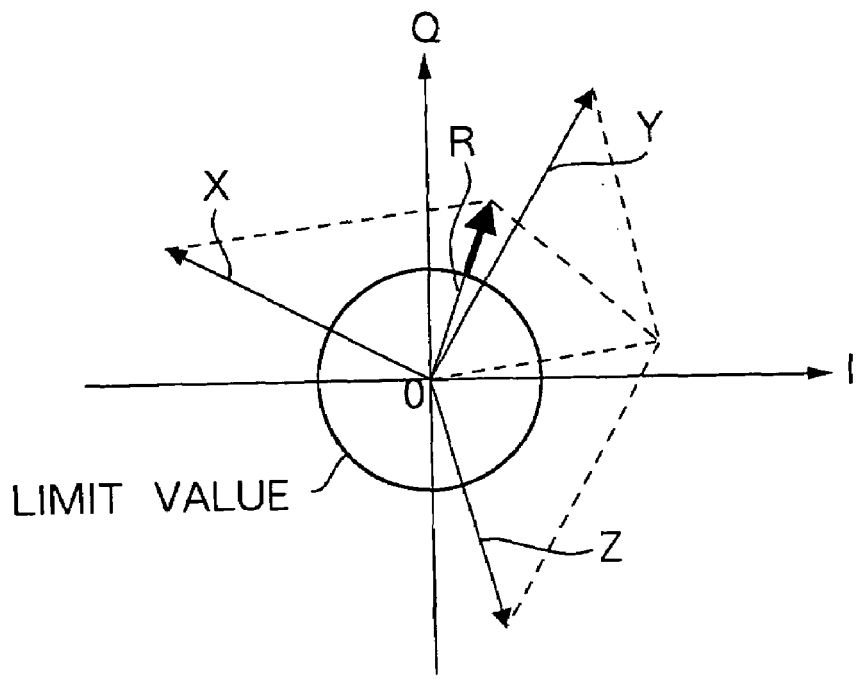
FIG. 5B is a view to explain advantages in the case of performing peak suppressing processing on a single-carrier signal.

As shown in FIG. 5A, when the peak limit is performed on each of single-carrier signals X, Y and Z with different phase and different amplitude on a phase plane, portions extending from a circle of the limit value are all clamped. On the contrary, when the peak limit is performed on a multicarrier signal, as shown in FIG. 5B, since the peak limit processing is performed using vector R obtained by combining single-carrier signals X, Y and Z as a reference, in terms of each single-carrier signal, excessive peak limit is not performed. In addition, as shown in the figure, vector R obtained by combining single-carrier signals X, Y and Z is small in amplitude because vector components of the single-carrier signals are canceled.

Then, in the circuit in FIG. 2, a multicarrier signal is actually synthesized, an instantaneous peak of the signal is detected, and a correction value is calculated to suppress the instantaneous peak, whereby it is possible to suppress the instantaneous peak assuredly. Since thus peak limit with extremely high reliability is performed for multicarrier signal, it is possible to meet predetermined specifications even when strict conditions are imposed as in applying the HSDPA scheme.

Further, in the present invention, it is possible to finely adjust peak suppressing characteristics by setting the carrier suppressing control parameter (hold-num).

Figure 6A:
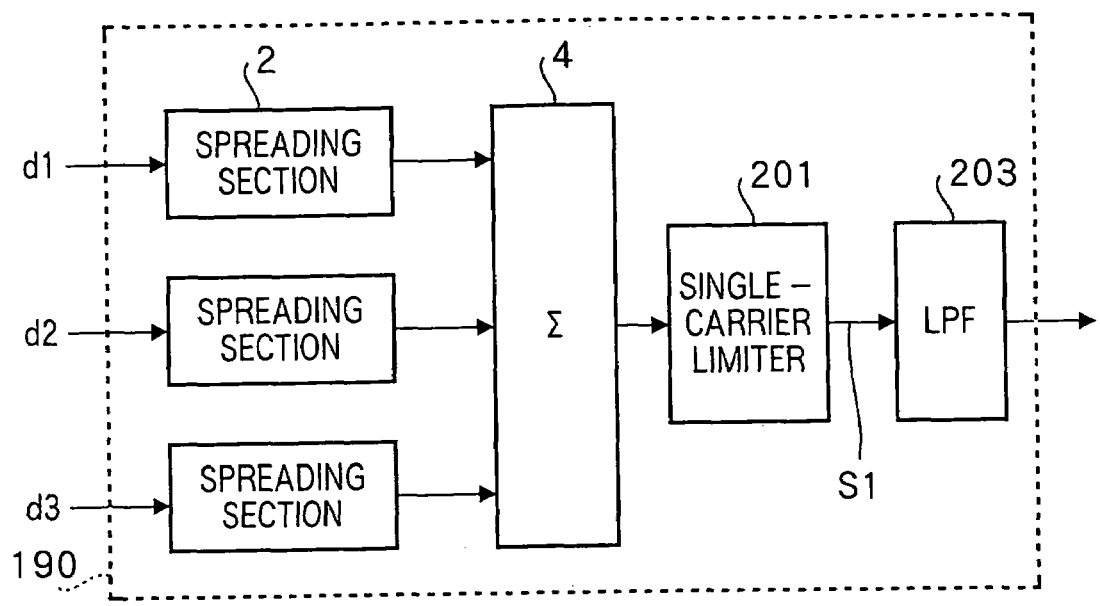
FIG. 6A is a block diagram illustrating a configuration of a conventional peak limit circuit that performs limit processing on a single-carrier signal.
Figure 6B:
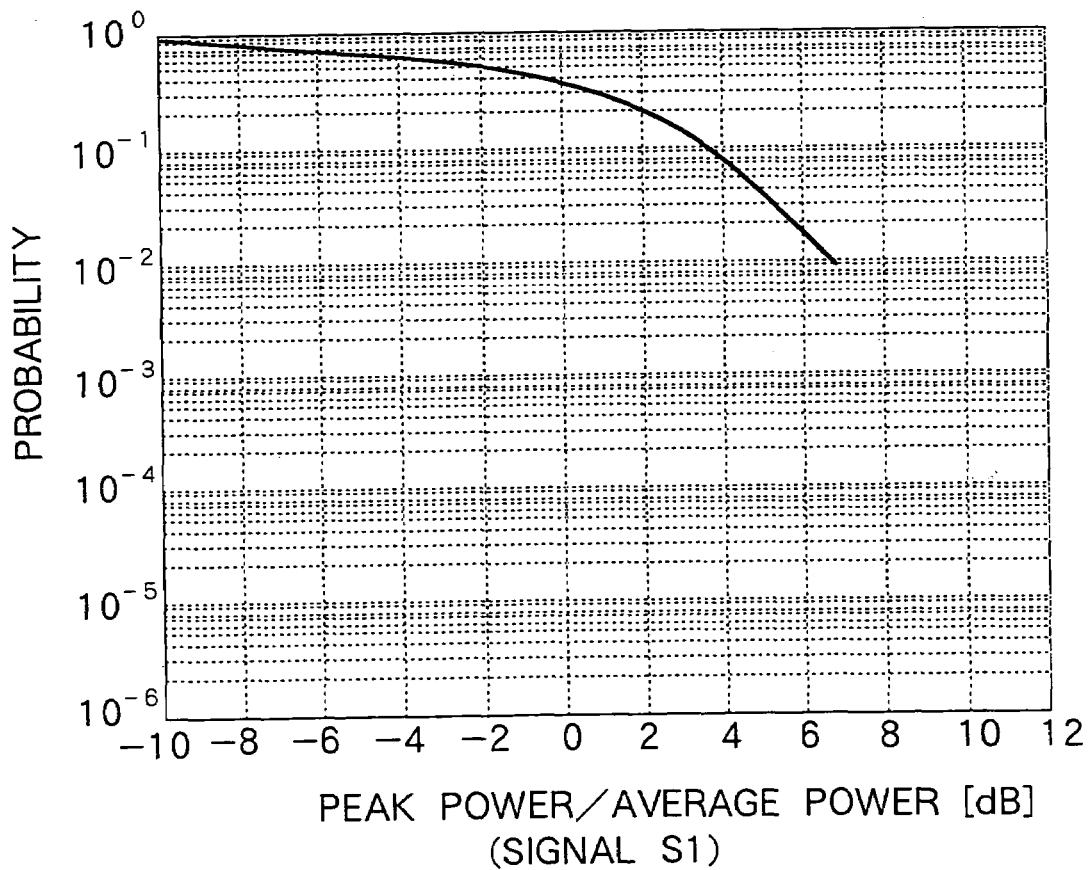
FIG. 6B is a graph showing CCDF characteristics of a single-carrier signal (prior to filtering by a low-pass filter) in the circuit in FIG. 6A.

FIG. 6A illustrates a conventional peak limit circuit that performs limit processing on single-carrier signal S1, and FIG. 6B shows characteristics of single-carrier signal S1.

FIG. 7A illustrates the same conventional peak limit circuit as in FIG. 6A, and FIG. 7B shows characteristics of the signal which has undergone peak suppression and is passed through low-pass filter (LPF) 203.

As shown in FIG. 7B, even when the single-carrier signal undergoes peak suppression, a peak is generated again by being passed through the low-pass filter, and the degree of peak suppression is considerably poor as compared with peak suppressing characteristics in the circuit of the present invention as shown in FIG. 3.

Figure 8A:
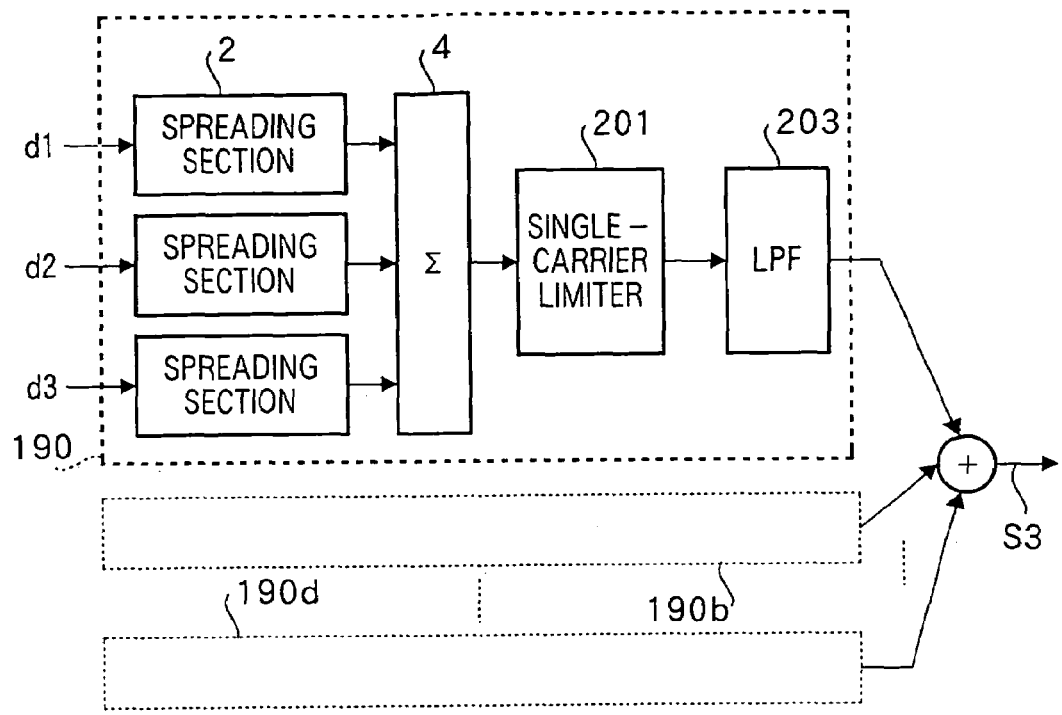
FIG. 8A is a block diagram illustrating a configuration of a conventional multicarrier signal generating circuit with conventional peak limit circuits each shown in FIG. 6A arranged in parallel.
Figure 8B:
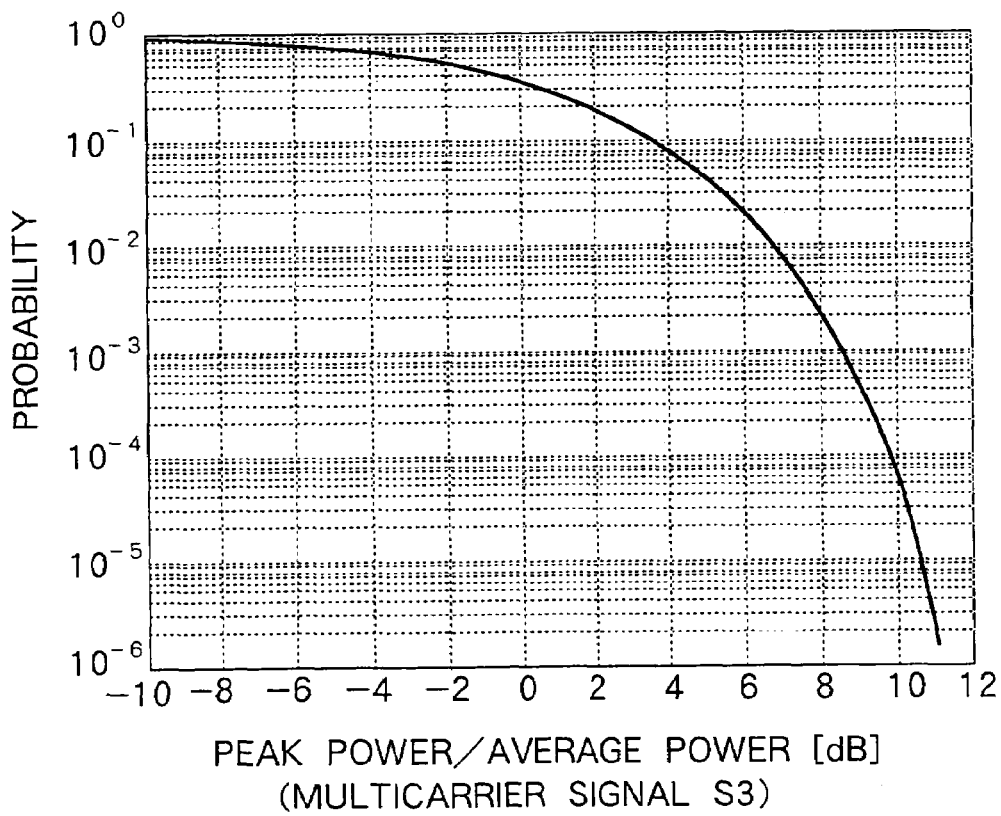
FIG. 8B is a graph showing CCDF characteristics of a multicarrier signal in the circuit in FIG. 8A.

FIG. 8A illustrates a conventional circuit that synthesizes a multicarrier signal using conventional peak limit circuits each shown in FIG. 6A arranged in parallel, and FIG. 8B is a view showing characteristics of multicarrier signal S3 output from the circuit in FIG. 8A.

Referring to FIGS. 9 to 12, the operation will be described of each of peak detecting section 572, relative comparison/determination section 574 and correction value calculating section 576 in correction value calculating section 570 shown on lower side of FIG. 2.

Figure 9:
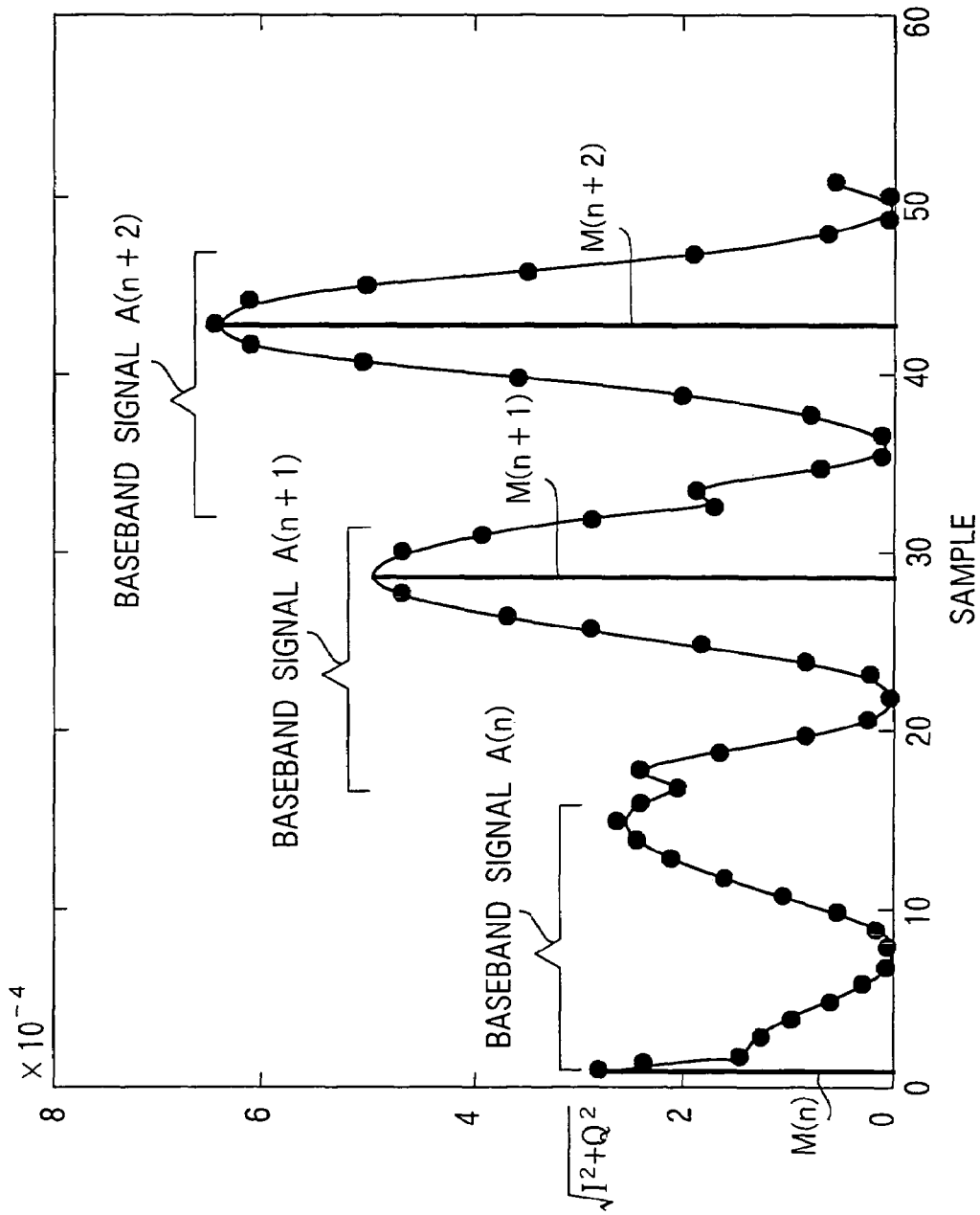
FIG. 9 is a graph to explain peak detecting operation in a peak correction value calculating section in FIG. 1B.

As shown in FIG. 9, peak detecting section 572 detects peak values of (M(n) to M(n+2)) of amplitude of baseband signals every 16 chips (herein, for convenience, baseband signals of 16 chips are assumed to be A(n) to A(n+2)).

Figure 10:
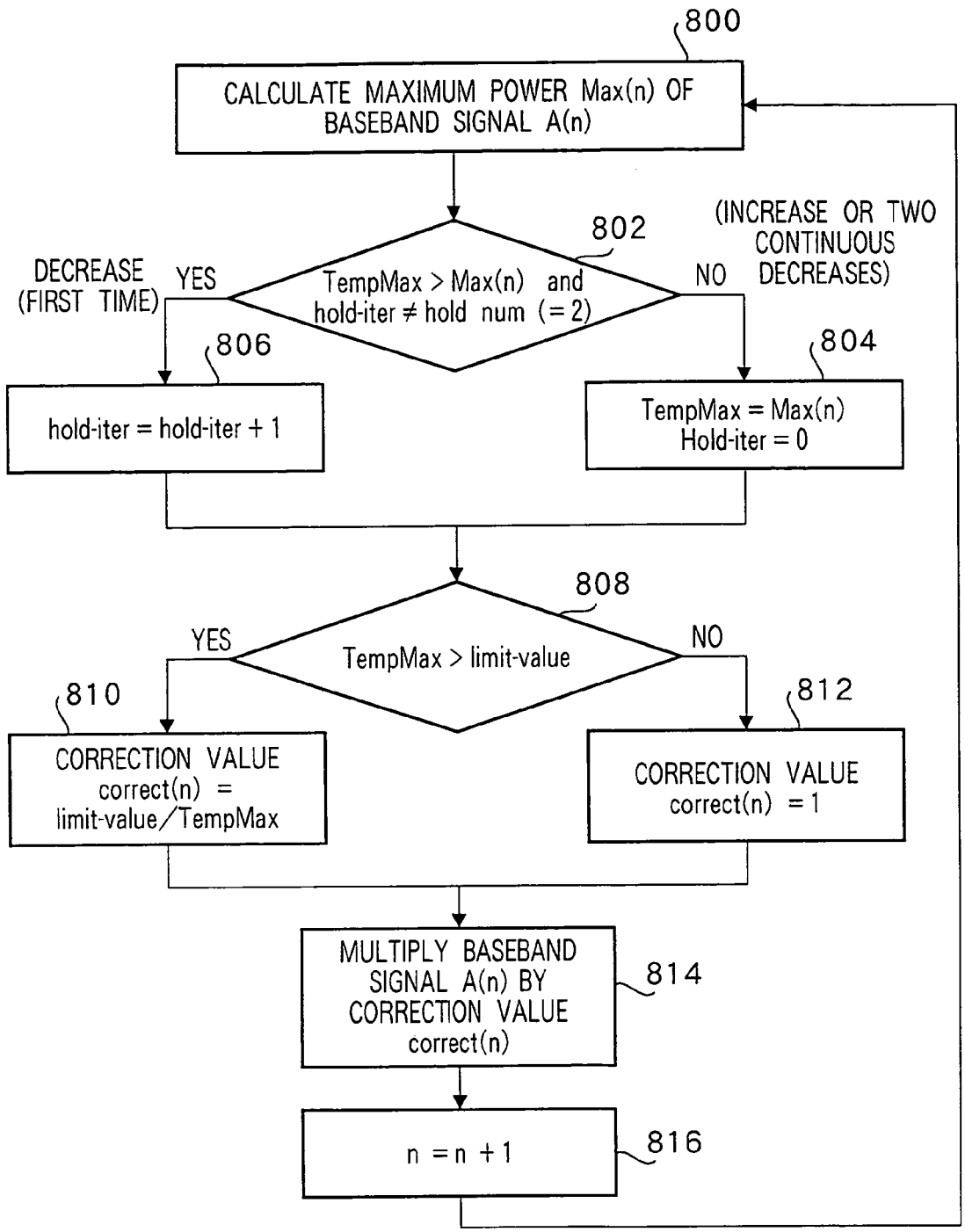
FIG. 10 is a flowchart illustrating procedures of primary operation in the peak correction value calculating section in FIG. 1B.

Relative comparison/determination section 574 and correction value calculating section 576 operate based on the flowchart shown in FIG. 10.

In other words, with respect to peak value Max (n) of amplitude of a currently measured baseband signal detected in peak detecting section 572 (step 800), relative comparison/determination section 574 determines whether the peak value Max (n) is smaller than a temporal peak value and whether the peak suppression control parameter (hold-iter=0) is not equal to a set value (hold-num: herein assumed as 2) (step 802).

When the determination result in step 802 is "yes", in other words, the currently detected peak value is smaller than the temporal peak value and the number of times the value continuously decreases is 1, the peak suppressing control parameter (hold-iter) is incremented and updated (step 806), while, when the result is "no", that is, the currently detected peak value is larger than the temporal peak value, or decreases continuously two times, the currently detected peak value is set as a present value, and the peak suppressing control parameter (hold-iter) is initialized and returned to zero.

Then, correction value calculating section 576 compares the limit value (limit-value) with the temporal peak value (step 808), and when the temporal peak value is larger, calculates a correction value for peak suppression using the temporal peak value (step 810), while, when the temporal peak value is smaller, making a correction value "1" because the peak suppression is not required (step 812).

The correction value is multiplied by the baseband signal (step 814), and the processing flow proceeds to a next step (step 816).

Figure 11:
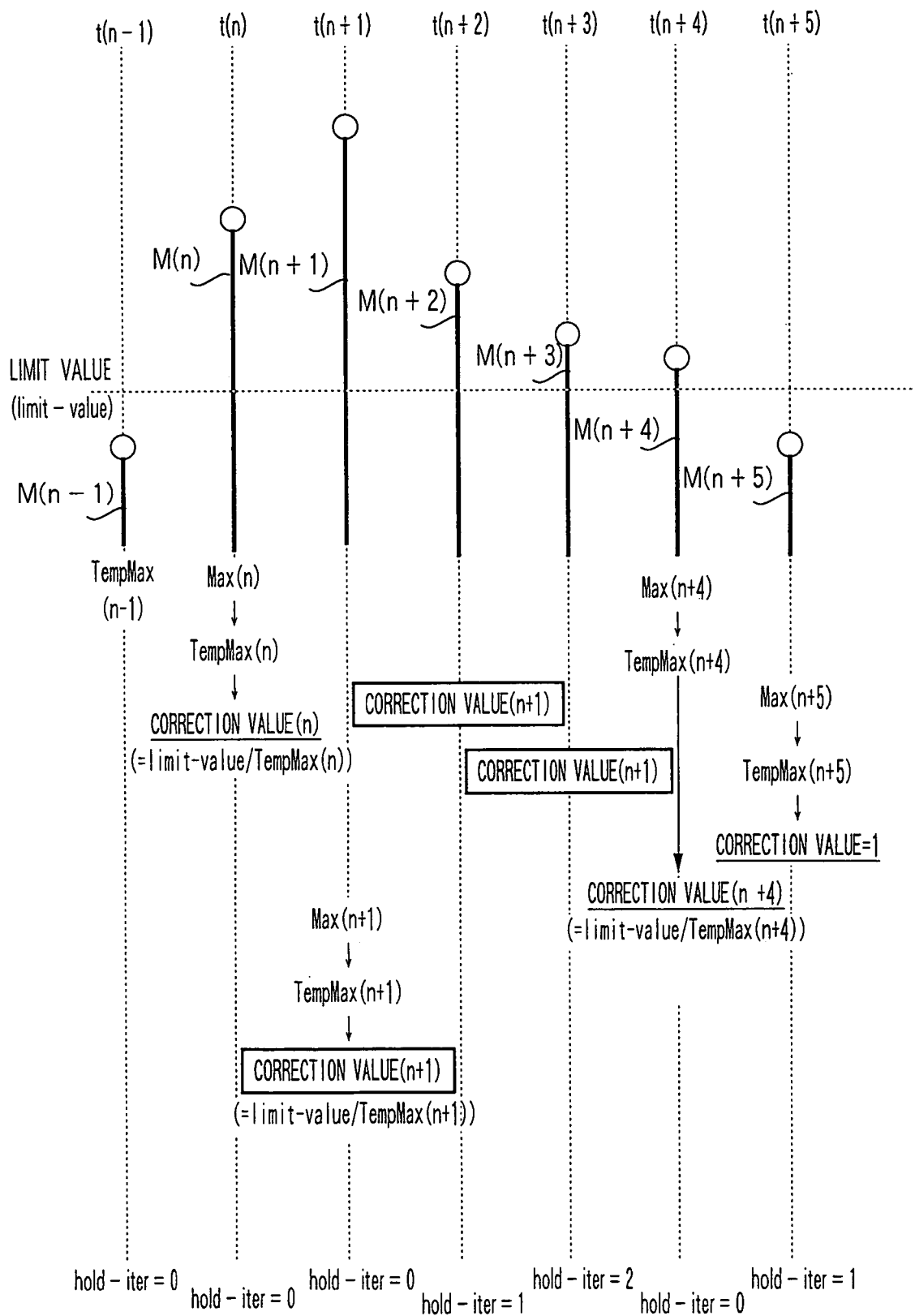
FIG. 11 is a view to explain specific procedures of calculating a correction value.

FIG. 11 illustrates a specific example of calculating a correction value.

As shown in the figure, the peak value increases during a period of from time t(n−1) to t(n+1), then decreases continuously, and decreases below the limit value (limit-value) at time t(n+5).

In this case, processing as shown in the figure is executed at each time. It is noted that at time t(t+2) and t(n+3), even the peak value decreases, the correction value based on a large peak value immediately before the peak value starts decreasing, that is, correction value (n+1) is used, and thus adaptive control is performed with importance placed on peak suppression.

Next, at time t(n+4), the peak decreases continuously (three times), exceeding the set value (hold-num=2) of peak suppressing control parameter. Therefore, in order to prevent signal quality from deteriorating, the peak limit is performed using the temporal peak value and relieved correction value, that is, correction value (n+4).

Then, at time t(n+5), since the peak limit is not required, the correction value is "1".

Increasing the set value (hold-num) of peak suppressing control parameter results in adaptive control with importance placed on peak suppression as shown in FIG. 3, and enables fine adjustment.

Figure 12:
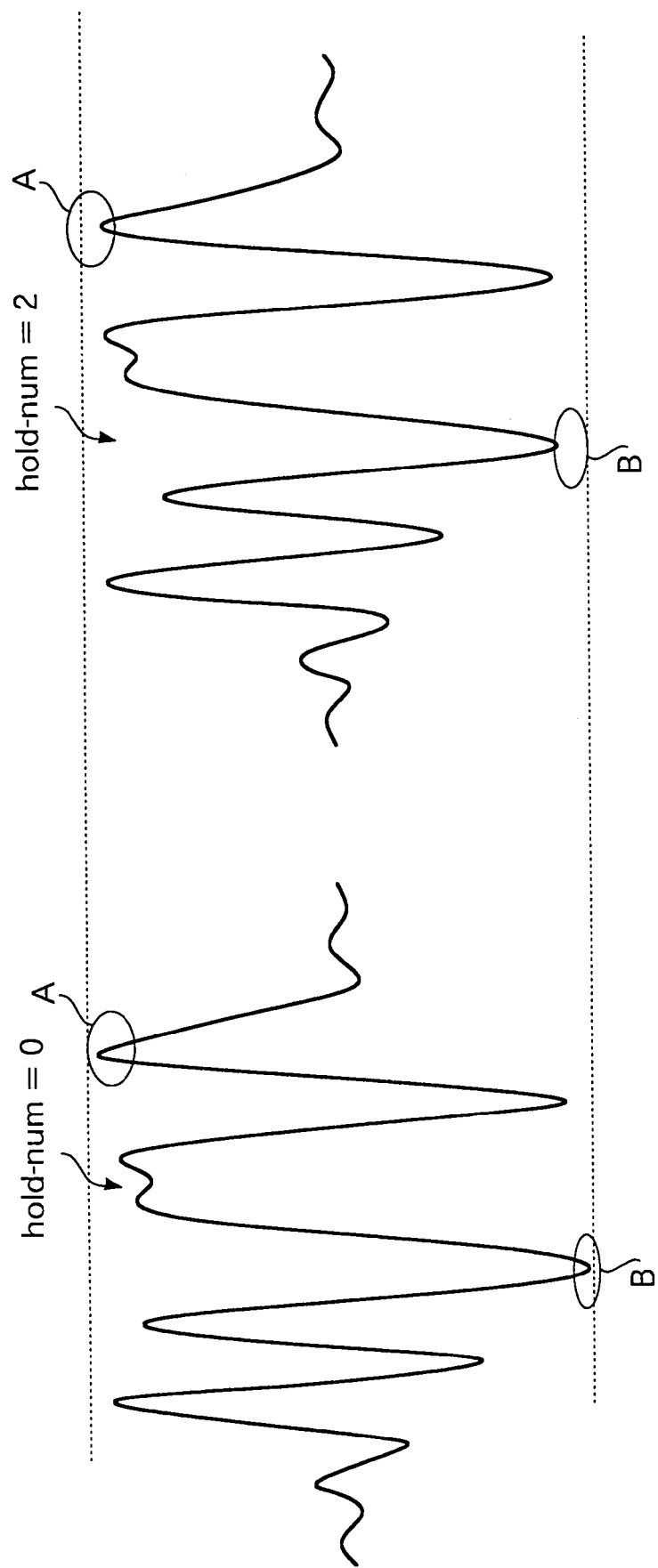
FIG. 12 is a view to explain effects by changes in set value of peak suppressing control parameter.

FIG. 12 shows changes in the degree of amplitude suppression of baseband signal when the set value (hold-num) of peak suppressing control parameter is "0" or "2". In the figure, as can be seen from portions A and B enclosed by solid lines, the set value (hold-num) of peak suppressing control parameter of "2" has a larger effect of peak suppression.

By setting the set value (hold-num) of peak suppressing control parameter as appropriately, it is possible to suppress peaks of a multicarrier signal to be within a predetermined level in any cases. It is there by possible to meet strict specifications assuredly.

The adaptive peak limiter will be described below with reference to FIGS. 13 to 17.

Figure 13:
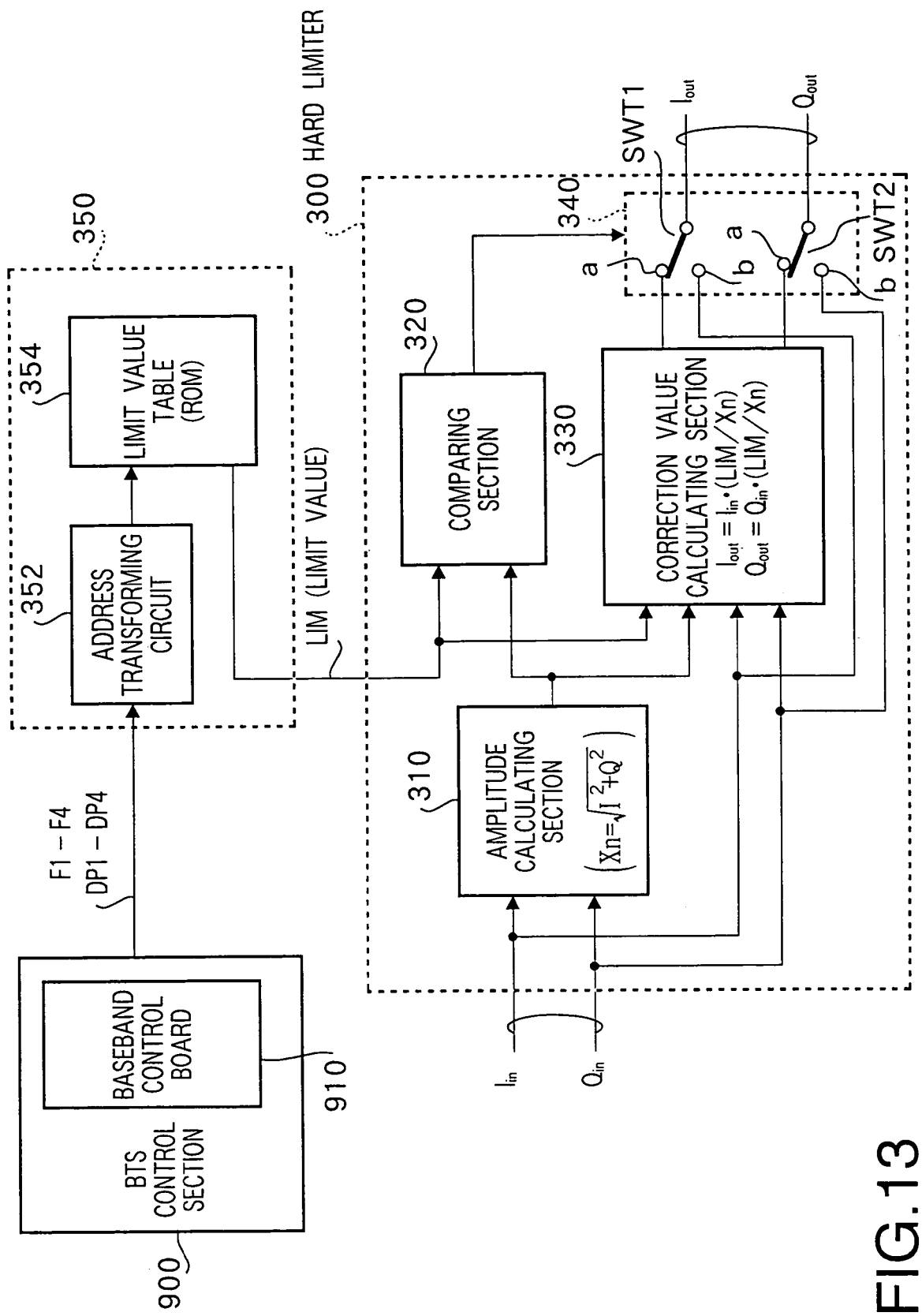
FIG. 13 is a block diagram illustrating one example of a configuration of an adaptive peak limiter of the present invention.

FIG. 13 is a block diagram illustrating a configuration of the adaptive peak limiter.

As described above, based on the on/off information (F1 to F4) indicative of whether or not a respective frequency channel is used and another on/off information (DP1 to DP4) indicative of whether or not HSDPA is applied to chip data on the respective frequency channel notified on a chip basis from baseband control board 910 in base station (BTS) control section 900, limit value output section 350 refers to the limit value table (lookup table) 354 to cause the limit value LIM to be output.

The hard limiter 300 has amplitude calculating section 310 that calculates amplitude Xn of each of input I and Q signals, comparing section 320 that compares the calculated amplitude with the limit value LIM, correction value calculating section 330 that calculates a correction value from the input I and Q signals, amplitude Xn and limit value LIM, and switch circuits SWT1 and SWT2.

Corresponding to a comparison result in comparing section 320, switches SWT1 and SWT2 are each switched, and when amplitude of an input signal exceeds the limit value LIM, the switches are switched to respective "a" terminals, while being switched to respective "b" terminals when amplitude of an input signal is less than the limit value LIM. When switches SWT1 and SWT2 are switched to respective "b" terminals, the input signal is not corrected and output.

Figures 14A, 14B:
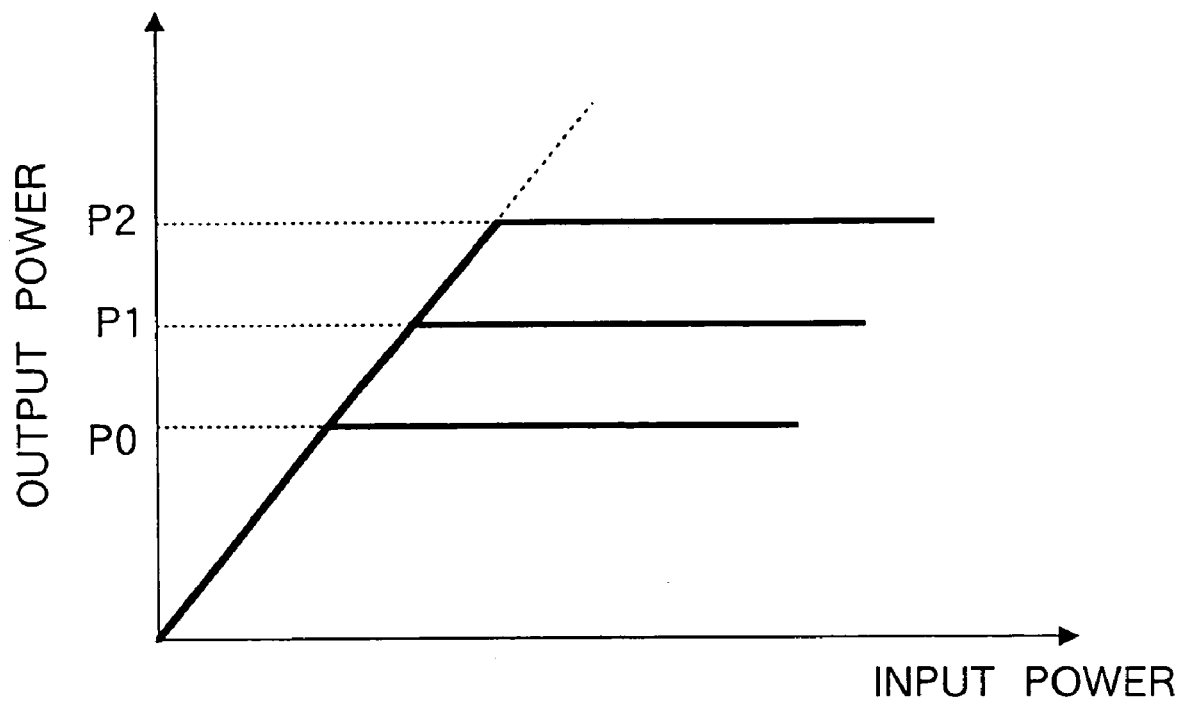
FIG. 14A is a graph showing output characteristics of a hard limiter.
FIG. 14B is a table showing a relative relationship between a limit value of the hard limier and signal quality of a transmission signal.

FIG. 14A is a view showing characteristics of an output signal of the hard limiter when the limit value is P0, P1 or P2, and FIG. 14B is a view showing the relative relationship between the limit value and quality of a transmission signal.

The operation of address transforming section 352 and configuration of limit value table (ROM) 354 in limit value output circuit 350 will be described specifically with reference to FIGS. 15 and 16.

Figure 15:
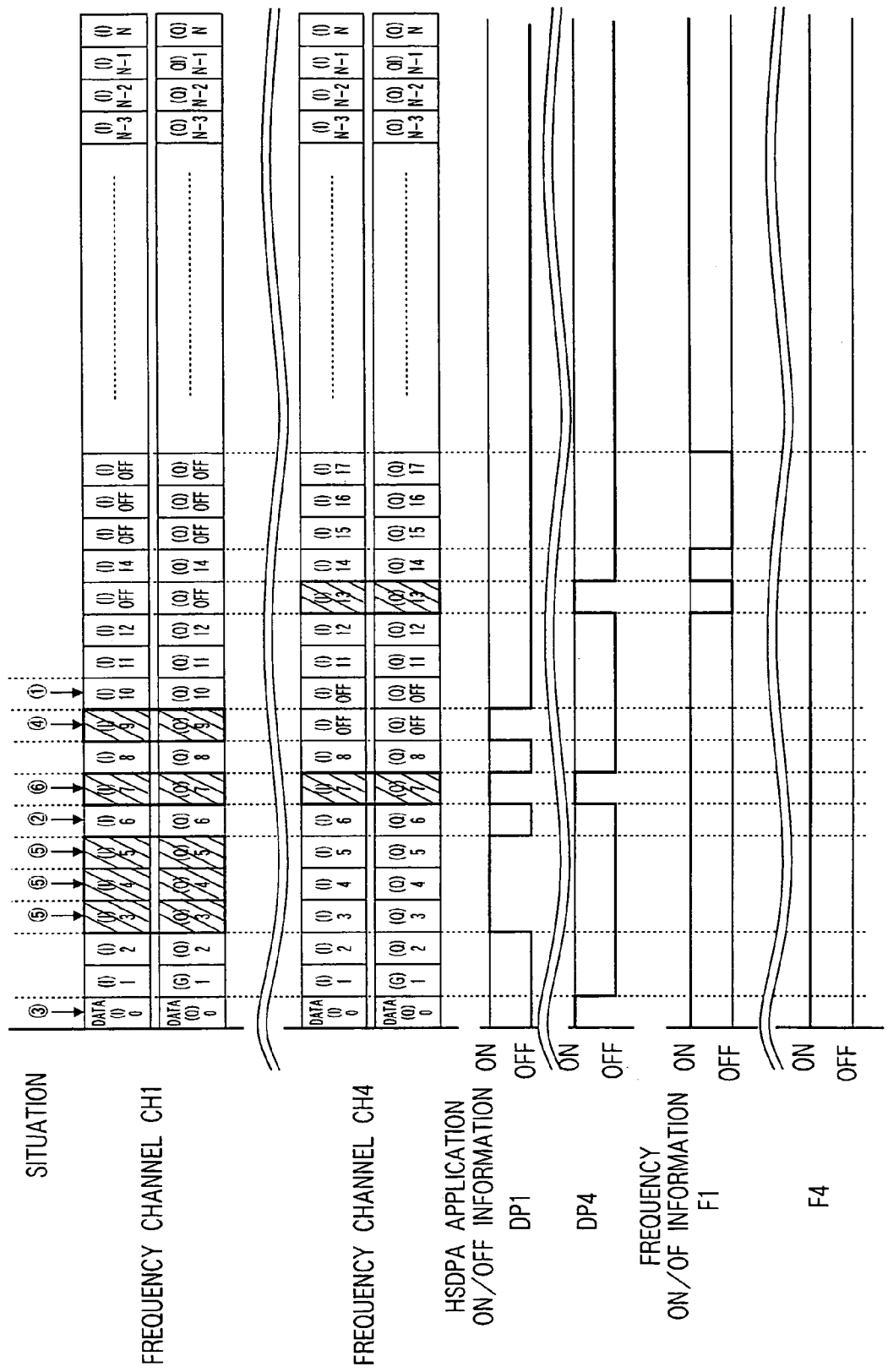
FIG. 15 is a timing diagram illustrating frequency channel on/off information and HSDPA application on/off information associated with a baseband signal.

FIG. 15 is a timing diagram illustrating states of baseband signals of four frequency channels CH1 to CH4 (each channel has two signals sequences, I and Q, and thus there are eight inputs) associated with sates of the on/off information (F1 to F4) indicative of whether or not a respective frequency channel is used and another on/off information (DP1 to DP4) indicative of whether or not HSDPA is applied to chip data on the respective frequency channel notified on a chip basis from baseband control board 910 in base station (BTS) control section 900.

For convenience, FIG. 15 does not show data of frequency channels CH2 and CH3. In the figure, shaded chips are chips to which HSDPA is applied.

As shown in the figure, the HSDPA application on/off information (DP1 to DP4) is high level on chips to which HSDPA is applied, and similarly, frequency on/off information (F1 to F4) is high level when a frequency channel is used.

As shown in FIG. 16, the HSDPA application on/off information (DP1 to DP4) and frequency on/off information (F1 to F4) is collectively transformed into address information of eight bits. In this case, "on" of each piece of information corresponds to "1", while "off" corresponds to "0".

In this way, total 256 patterns exist. For each index, ROM address is associated with ROM data (data of limit value), and ROM data (data of limit value) is written in ROM to generate a lookup table.

As described in FIG. 16, for example, situations ① to ⑦ are assumed.

In consideration of each situation, the limit value is set such that a greater limit value is applied to a frequency channel that uses HSDPA than a frequency channel that does not use HSDPA to prevent signal quality from deteriorating, and that in a case where an unused frequency channel is present, as the number of unused frequency channels is increased, the limit value for use in a used frequency channel is increased, to prevent signal quality from deteriorating.

As indicated in FIG. 16, with respect to limit values L1 and L2, L2 is greater than L1. L3 is calculated by obtaining a fraction of a denominator that is the number of frequency channels with frequency on/off bit on and a numerator of 4, raising the fraction to the power of ½, and further multiplying the resultant by L1. Similarly, L4 is calculated by obtaining a fraction of a denominator that is the number of frequency channels with frequency on/off bit on and a numerator of 4, raising the fraction to the power of ½, and further multiplying the resultant by L2.

Figure 17A:
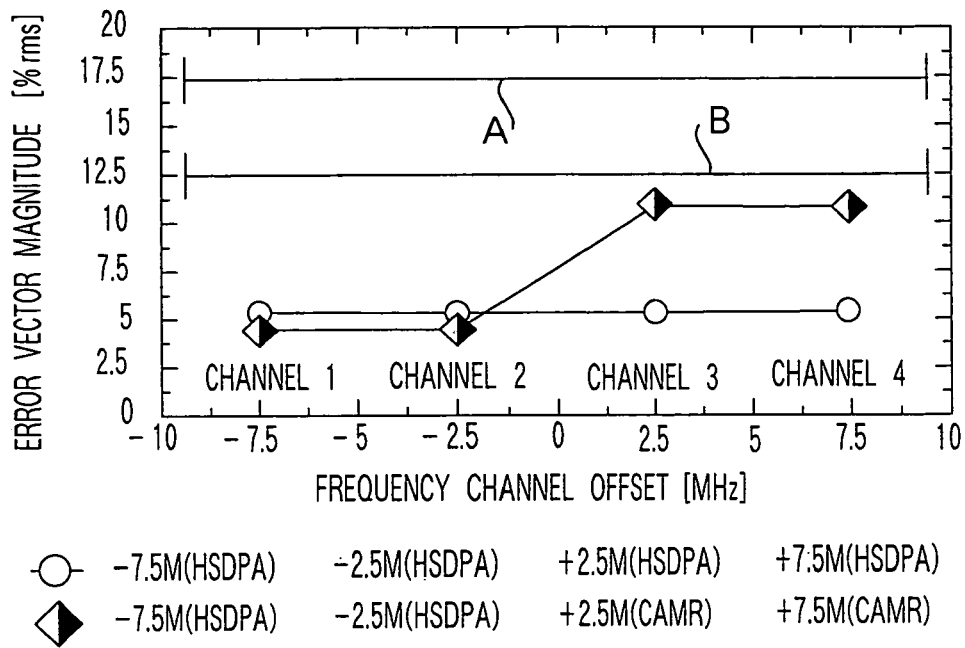
FIG. 17A is a graph showing an example of a measurement result of error vector magnitude.
Figure 17B:
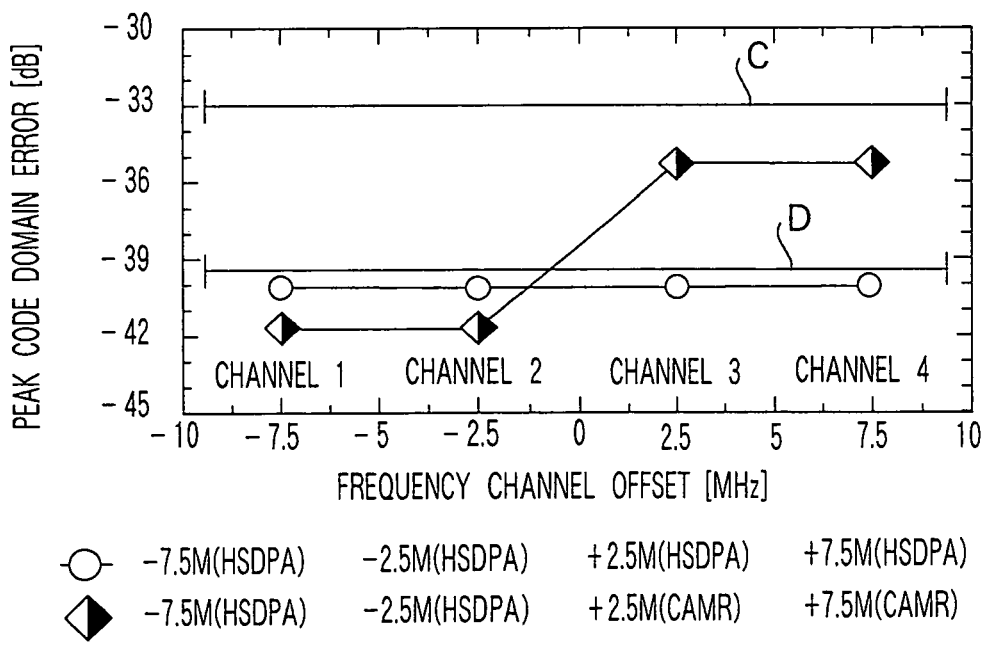
FIG. 17B is a graph showing an example of a measurement result of a peak code domain error.

FIGS. 17A and 17B are views each showing an example of effects in the case of applying the adaptive peak limiter.

FIG. 17A is a view showing results of measurements (simulation) of error vector magnitude that is an index to evaluate the signal quality on samples (plotted by white circles) to which HSDPA is not applied and samples (plotted by lozenges with black-shaded half) to which DSDPA is applied.

In the figure, standard A is a requirement (criterion by which to evaluate samples plotted by white circles) in 3GPP R99, and standard B is a requirement (criterion by which to evaluate samples plotted by lozenges with black-shaded half) in 3GPP R5.

Similarly, FIG. 17B shows samples measured on peak code domain error, where standard C is a requirement in 3GPP R99, and standard D is a requirement in 3GPP R5.

It is understood that the requirement of the signal quality is satisfied in both FIGS. 17A and 17B.

Figure 18A:
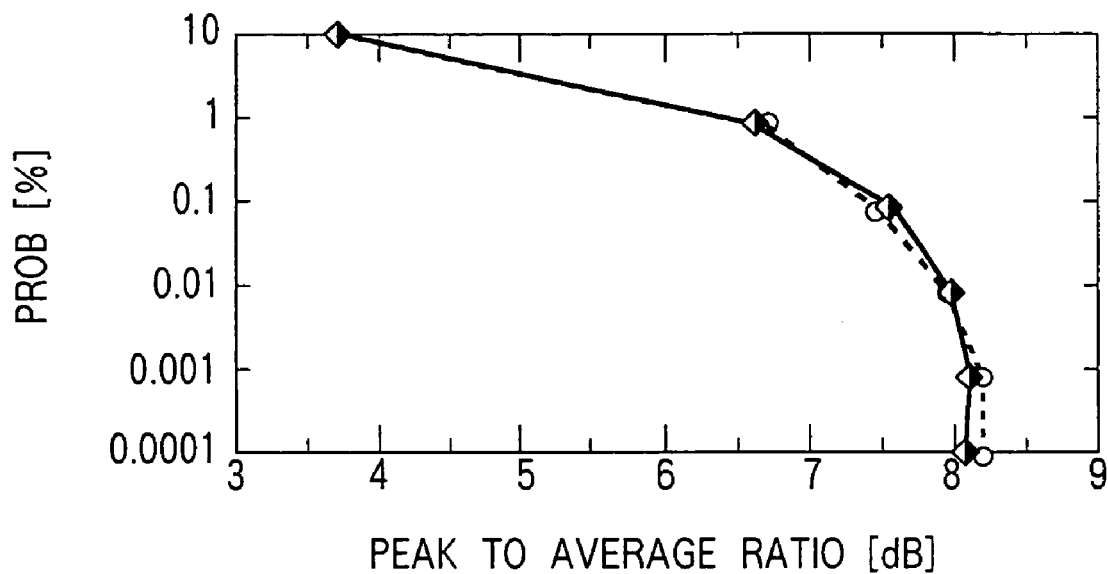
FIG. 18A is a graph showing an example of a result of measuring CCDF characteristics of a multicarrier transmission signal using test model 1 of 3GPP.
Figure 18B:
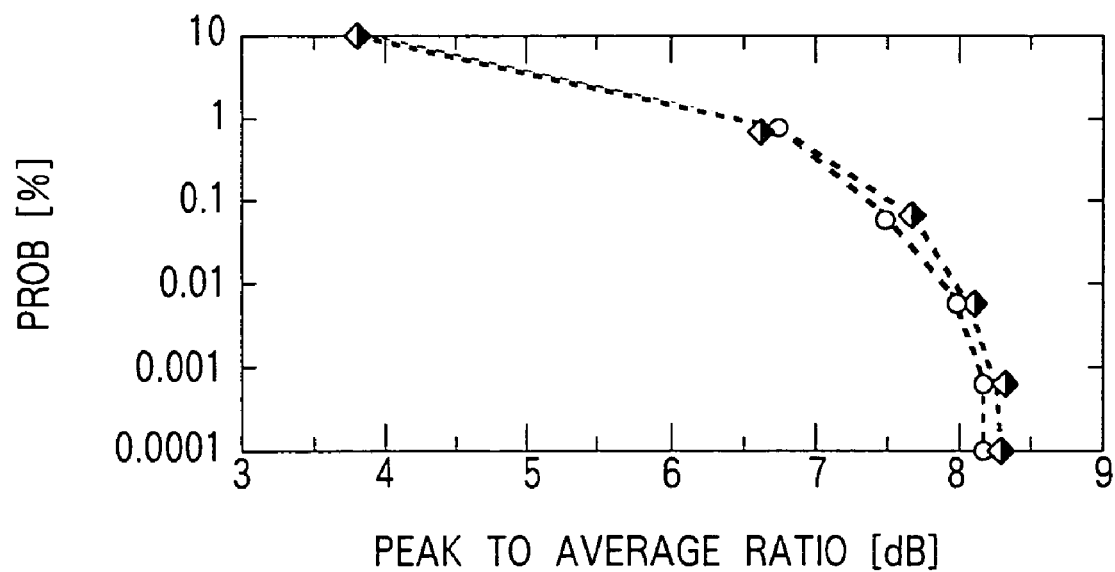
FIG. 18B is a graph showing an example of a result of measuring CCDF characteristics of a multicarrier transmission signal using test model 3 of 3GPP.

FIGS. 18A and 18B are graphs each showing an example of a result of measuring the degree of peak suppression of a multicarrier transmission signal output from the baseband signal processing LSI as illustrated in FIG. 1, using test model 1 or test model 3 of 3GPP.

As can be seen from both graphs, changes in test model do not vary the shape of the line of property of peak suppressing characteristics, and desired peak suppression is always achieved.

Therefore, according to the present invention, it is possible to suppress instantaneous peaks of the entire multicarrier transmission signal to be within a desired range in any cases, while finely adjusting the amplitude of the transmission signal depending on situation of each frequency channel, and to achieve both peak suppression and assurance of signal quality.

The hybrid distortion compensating circuit (including a high-frequency amplifier) shown in FIG. 19 (and in FIG. 1B) will be described specifically.

As described above, CDMA multicarrier communications require higher linearity in a high-frequency power amplifier than in other mobile communications. Therefore, power efficiency deteriorates remarkably unless the linearity of a power amplifier is compensated using distortion compensating techniques such as adaptive pre-distortion.

An input signal of a power amplifier has, for example, a bandwidth of 15 MHz to 20 MHz. Accordingly, the band of a distortion ranges from about 100 MHz to 200 MHz.

In order to compensate for the distortion component only by adaptive pre-distortion, it is required to perform D/A conversion on digital signals subjected to the pre-distortion processing with a sampling frequency of from about 100 MHz to 200 MHz the same as the band of the distortion component.

Further, when the adaptive pre-distortion processing is executed, since it is necessary for an output signal of the power amplifier to be returned to the digital signal processing system, it is similarly required to perform A/D conversion with a sampling frequency of from about 100 MHz to 200 MHz the same as the band of the distortion component.

Furthermore, according to specifications of CDMA communication system, D/A converters and A/D converters require the resolution of from 12 bits to 16 bits.

In current semiconductor manufacturing techniques, it is considerably difficult to manufacture a D/A converter and A/D converter operable in a range of 100 MHz to 200 MHz with high resolution (12 bits to 16 bits) secured.

Further, if such D/A converter and A/D converter can be manufactured, power consumption will be enormous in operating. Such products go against distortion compensation to improve power efficiency.

Figure 19:
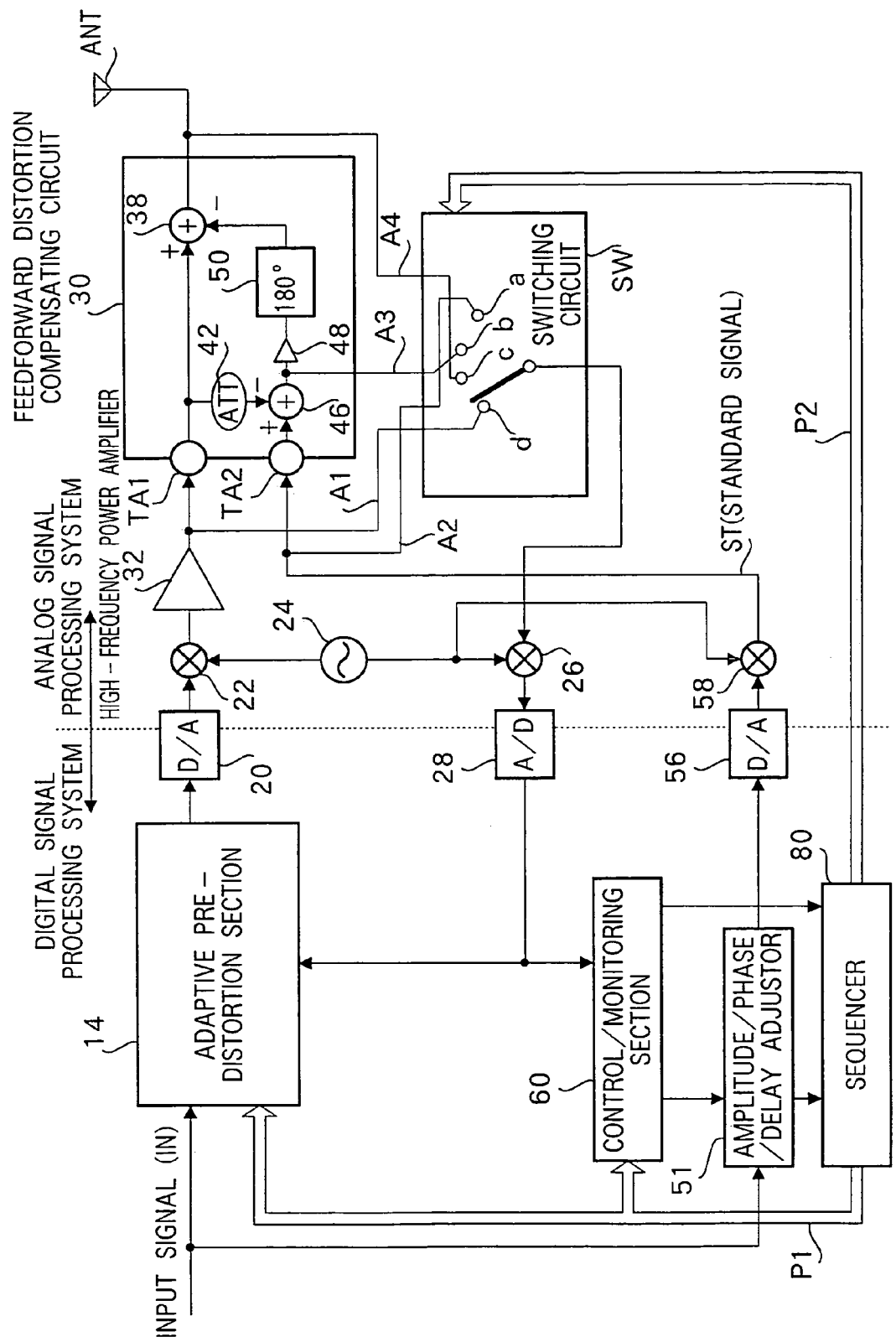
FIG. 19 a block diagram showing an example of a configuration of a hybrid distortion compensating circuit (including a high-frequency amplifier) used in the present invention.

Therefore, in the hybrid distortion compensating circuit in FIG. 19 limits a band of a signal (input baseband signal) to which the adaptive pre-distortion processing is applied to frequencies enabling the resolution of 12 bits to 16 bits in the D/A converter and A/D converter.

Then, the feed forward distortion compensating circuit with characteristics accurately adjusted effectively removes distortion (distortion of high order) occurring in a band of higher frequencies by digital signal processing.

In this way, it is possible to implement distortion compensation with extremely high precision that could not be achieved conventionally, using exiting LSI techniques.

The specific description is given below.

As illustrated in FIG. 19, the hybrid distortion compensating circuit has, as primary structural elements, adaptive pre-distortion section (digital signal processing section) 14, high-frequency power amplifier 32, feed forward distortion compensating circuit (high-frequency power analog circuit) 30 with two input terminals TA1 and TA2, high-frequency switching circuit (hereinafter, simply referred to as a switching circuit) SW to fetch selectively either of two input signals, output signal and feedforward loop signal of feedforward distortion compensating circuit 30, control/monitoring section (belonging to the digital signal processing system), amplitude/phase/delay adjustor 51 that adjusts the amplitude (gain), phase and delay of a standard signal (that is an input signal (IN) of the distortion compensating circuit) provided to input terminal TA2 of feedforward distortion compensating circuit 30, and sequencer 80 that controls switching of switching circuit SW and provides information (P1 and P2) required for causing sections to operate sequentially to the sections.

A signal path on which signals are provided and received between the digital signal processing system and analog signal processing system is provided with D/A converters 20 and 56, A/D converter 28 and frequency converting circuit. The frequency converting circuit has RF carrier oscillator 24, and mixers 22, 26 and 58 as structural elements.

As shown in the figure, feedforward distortion compensating circuit 30 has input terminal TA1 to input a signal including a distortion component (linear distortion component remaining without being removed by pre-distortion distortion compensation) to a main path, and input terminal TA2 to input a standard signal that does not include distortion to the feedforward loop. In addition, the main path is a line connecting input terminal TA1 and combiner 38.

The feedforward loop has attenuator 42 that adjusts signal amplitude, combiner 46 to separate a distortion component from a signal of the main path, error amplifier 48 that amplifies the amplitude of a signal of a distortion component, shifter 50 to invert a phase of an output signal of error amplifier 46, and combiner 38 to return an output signal of shifter 50 to the main path.

The hybrid distortion compensating circuit has a hybrid structure with a combination of adaptive pre-distortion section 14 that performs adaptive pre-distortion processing on baseband digital signals and feedforward distortion compensating circuit 30.

However, it is impossible to simply combine both compensation schemes. It is because feedforward distortion compensation, as the name indicates, executes distortion compensation in the order in which signals are input and output, while adaptive pre-distortion distortion compensation is feedback type of distortion compensation, thus signal routes are different therebetween, and therefore, in order to combine both the schemes, it is required to divide both schemes into respective unit elements to facilitate combining both schemes, and configure again a hybrid structure.

Therefore, in the circuit in FIG. 19, feedforward distortion compensating circuit 30 is provided with two input terminals TA1 and TA2, and thus provided with a new configuration to receive as its inputs independently of each other an output signal (including a remaining distortion component that cannot be removed by pre-distortion distortion compensation) of high-frequency power amplifier 32, and a standard signal that does not include distortion, thereby enabling a combination of different types of distortion compensating circuits.

The distortion compensating processing in the hybrid distortion compensation method is principally divided into two kinds of processing.

In other words, the adaptive pre-distortion distortion compensation in full-digital control removes with high stability a distortion component of low order of the high-frequency power amplifier that is a distortion component with a high level within sampling frequency band of D/A converters 20 and 56 and A/D converter 28.

Then, remaining high-order IM distortion component with a low level (component outside sampling frequency band) is removed by the feedforward distortion compensating processing. In this way, it is possible to implement the wide-band distortion compensation with high accuracy that has not been achieved before.

An issue is that unless the precision is high in the feedforward distortion compensation using the analog circuit, the high-order IM distortion component with a low level is not removed adequately that could not be removed by the adaptive pre-distortion distortion compensation, and that it is not possible to achieve dramatic improvements in precision in removing distortion that the present invention aims.

The distortion cancellation with high precision in feedforward distortion compensating circuit 30 is achieved on the assumption that two signals respectively input to two input terminals TA1 and TA2 are in completely agreement with each other in input level (amplitude), phase and delay.

Therefore, the distortion compensating circuit (hybrid distortion compensating circuit) in FIG. 19 is provided with an adjustment mechanism that performs adjustments so as to bring each of amplitude and others of two signals input to feedforward distortion compensating circuit 30 into completely coincident with respective one another, and in this respect, the distortion compensating circuit of the present invention has an extremely important feature.

In other words, in the distortion compensating circuit in FIG. 19, with attention attracted to a feedback path (signal path to return a signal subjected to feed forward distortion compensation processing to adaptive pre-distortion section 14) that is inevitable in the adaptive pre-distortion processing, using the feedback path, two input signals (signals A1 and A2 in FIG. 19) of feedforward distortion compensating circuit 30 and signal of feedforward loop (signal A3 in FIG. 19) are returned to the digital signal processing system.

Then, using high-precision digital signal processing, control/monitoring section 60 measures precisely differences (at least a difference in either of characteristics) in amplitude (gain), initial phase and transmission delay between two input signals of feedforward distortion compensating circuit 30.

Next, it is preferable that the adjustor 50 for amplitude and others adjusts at least one of the amplitude, phase and delay of a standard signal (input signal (IN) of the distortion compensating circuit) so as to cancel the measured difference. In addition, practically, it is preferable to adjust all the characteristics.

In this way, characteristics such as the amplitude (gain), initial phase and transmission delay of two input signals of feedforward distortion compensating circuit 30 are in completely good agreement with respective one, and conditions to perform the feedforward distortion compensation are satisfied.

In output signals of high-frequency power amplifier 33 input to feedforward distortion compensating circuit 30, distortion with a high level is removed by the pre-distortion distortion compensation.

Accordingly, a distortion component with a high level is not input to error amplifier 48 existing in the feedforward loop. It is thereby possible to set the error amplifier for a low power amplification rate, thus contributing to reduced power consumption.

After finishing the pre-distortion processing and characteristic adjustments of two signals of feedforward distortion compensating circuit 30, switching circuit SW outputs an output signal (signal A4 in FIG. 19) of feedforward distortion compensating circuit 30 to return to the digital signal processing system.

Control/monitoring section 60 monitors the characteristics of feedback signals, and when desired precision cannot be assured in distortion compensation, executes again sequentially the pre-distortion processing and characteristic adjustments of two signals of feedforward distortion compensating circuit 30. The order of signal processing is controlled by sequencer 80.

Figure 20:
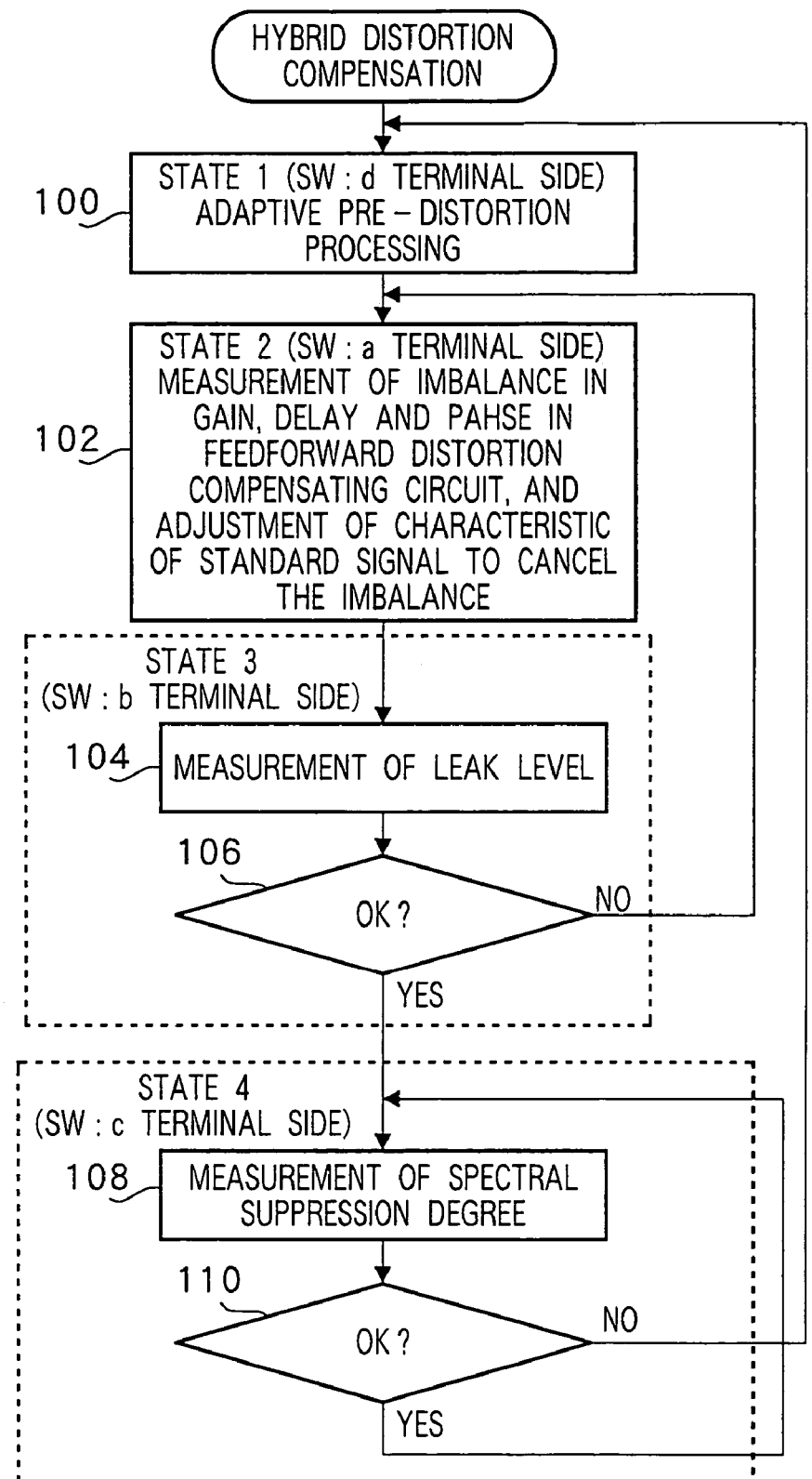
FIG. 20 is a flowchart illustrating procedures of primary operation in the hybrid distortion compensating circuit.

The primary operation (and primary states of the circuits) as described above is summarized as shown in FIG. 20.

That is, first, the switching circuit (SW) is switched to "d" terminal side, and adaptive pre-distortion processing is carried out (state 1, step 100).

The switching circuit (SW) is next switched to "a" terminal side.

The imbalance in the gain (amplitude), delay and phase between two input signals (input signal to the main path and standard signal) in feedforward distortion compensating circuit 30 is measured, and to cancel the invalance, characteristics of the standard signal is adjusted (state 2, step 102).

The switching circuit (SW) is next switched to "b" terminal side, thus shifting to state 3 to check a result of adjustment in state 2.

In state 3, a power level (leak level of the standard signal) of components of the standard signal is measured except a distortion signal in the feedforward loop (step 104). It is determined whether or not the leak level exceeds a threshold, that is, whether the leak amount is allowable (OK) or not, and at the time of NG, the processing flow returns to step 102, while proceeding to state 4 at the time of OK (step 106).

In state 4, the switching circuit (SW) is switched to "c" terminal side. Then, the frequency spectrum of a final output signal of the distortion compensating circuit is measured, and compared with a predetermined standard mask pattern (spectrum emission mask pattern) to determine a state of suppression in distortion on the frequency axis (step 108).

As a result of the determination, when the frequency spectrum is suppressed to be within an allowable range (step 110), the processing flow returns to step 108 to continue monitoring, while returning to step 100 when the spectrum is not suppressed (step 110) to execute the above-mentioned processing sequentially.

FIGS. 21A to 21D respectively show frequency spectra of the input signal (the number of carrier is "3") pre-distortion signal, standard signal in the feedforward distortion compensation and output signal in the circuit in FIG. 19.

As can be seen from the figures, according to the present invention, it is possible to perform distortion compensation with high precision in a wide range.

Thus, the hybrid distortion compensating circuit in FIG. 19 has adaptive pre-distortion section 14 that provides an input digital signal with distortion with inverse characteristics to non-linear characteristics of the power amplifier, and feedforward distortion compensating circuit 30 that compensates for a distortion component, which cannot be compensated in adaptive pre-distortion section 14, by feedforward loop, where feedforward distortion compensating circuit 30 has two signal input terminals TA1 and TA2 enabling two signals to be input separately, a signal subjected to the adaptive pre-distortion processing in pre-distortion section 14 is input to one of the signal input terminals, TA1, while a standard signal is input to the other one of the signal input terminals, TA2, and the standard signal corresponds to an input digital signal prior to the pre-distortion processing in pre-distortion section 14, and thus connects both circuits in a manner capable of drawing maximum characteristics of each circuit.

In other words, the distortion compensating circuit in FIG. 19 is a new distortion compensating circuit in full-digital control having a circuit structure connecting a digital signal processing circuit and high-frequency power analog circuit via a signal path containing D/A converters and A/D converter.

The distortion compensating circuit preferably performs processing of following items ① to ⑤ and obtains effectiveness as described below.

① The adaptive pre-distortion processing is performed in digital signal processing.

Since the pre-distortion is implemented by digital signal processing, it is possible to perform the processing with higher precision than in analog pre-distortion.

② A high-frequency analog signal is fetched from feedforward distortion compensating circuit 30, the fetched analog signal is converted into a digital signal, desired characteristics of the digital signal are measured with extremely high precision using the advance digital signal processing such as frequency spectral analysis, and the measurement result is used as a base for controlling and monitoring the entire circuit.

In other words, since control and monitoring is performed using as a base high-precision data incomparably than the analog signal processing, significant increases are obtained in both the adaptive pre-distortion processing function and feedforward distortion compensating function, and the distortion compensation capability is dramatically improved.

③ The distortion compensating processing is divided into a plurality of stages that are controlled sequentially.

Although communication environments vary every instant, it is regarded characteristics of a signal do not vary in a short term. Focusing on this respect, by executing a plurality of stages sequentially according to predetermined procedures, it is possible to execute the distortion compensation processing in digital control reasonably.

④ The plurality of stages includes, for example, a first stage of performing the adaptive pre-distortion processing, a second stage of adjusting and matching characteristics such as the amplitude, phase and delay amount of two input signals independently input to feedforward distortion compensating circuit 30, that is, an input signal to the main path that contains non-linear distortion and standard signal that does not contain non-linear distortion (signal to be input to the feedforward loop), a third stage of checking a result of the adjustment of the second stage, and a fourth stage of monitoring characteristics of a signal subjected to the feedforward distortion compensation.

Since the adjustment is always carried out precisely to match characteristics of two independent input signals of feedforward distortion compensating circuit 30 with each other, it is possible to eliminate adverse effects caused by the presence of adaptive pre-distortion section 14 in a first half on the feedforward distortion compensation. Accordingly, the precision is assured in each of adaptive pre-distortion and feedforward distortion compensation, and the synergy of both processing enables remarkably improved distortion compensating performance.

That is, an adaptive pre-distortion distortion compensating circuit in digital control is not able to remove a high-order IM distortion component (inter-modulation distortion component) with a low level spread out of a band of the sampling frequency of an A/D converter and D/A converter.

However, it is possible to remove a low-order distortion component of a power amplifier that is a high-level distortion component in a band within the sampling frequency with high stability. Then, remaining high-order IM distortion component with a low level is removed effectively in the high-precision feedforward distortion compensation processing, thus implementing the distortion compensation on signals in a wide band with stability and with high accuracy.

Further, since the distortion is suppressed accurately, it is possible to decrease the gain of an error amplifier provided in the feedforward loop in feedforward distortion compensating circuit 300, resulting in reduced power consumption.

⑤ Through the first to third stages as described above, when a series of adjustments is finished on the entire distortion compensating circuit, the processing flow proceeds to a monitoring stage (fourth stage) As long as the distortion is suppressed to be within a predetermined range, adjustments are not carried out such as adaptive adjustments of pre-distortion characteristics and adjustments of characteristics of input signals of feedforward distortion compensating circuit 300, and characteristics of each circuit are fixed during this period. Accordingly, also in this respect, it is possible to reduce power consumption, as distinct from an analog circuit that always performs adaptive control.

(6) Further, since it is possible to use digital signal processing functions (such as correlation detection and power measurement) with which recent mobile communication apparatuses are generally provided, implementing the distortion compensating method of the present invention is relatively easy and has great value in practical use.

As shown in FIGS. 1A and 1B, by combining techniques of the present invention, it is possible to obtain excellent advantages that have not been obtained before.

That is, by the technique of suppressing a peak of a multicarrier transmission signal, it is possible to suppress instantaneous peaks on the entire multicarrier transmission signal to be within specifications in any cases, and it is thereby possible to prevent power efficiency in a high-frequency power amplifier disposed subsequently from deteriorating.

Figure 22:
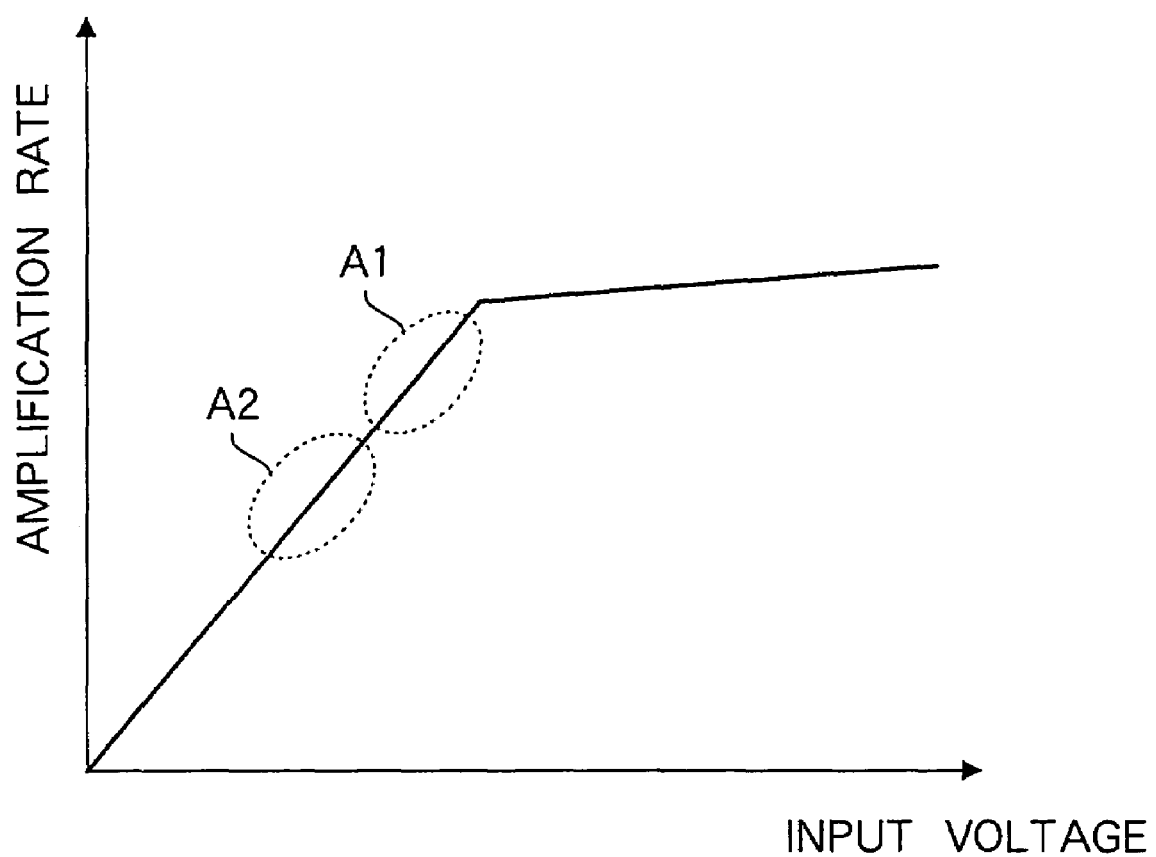
FIG. 22 is a graph to explain power efficiency of a high-frequency amplifier.

In other words, when the peak suppression of a multicarrier signal is not sufficient, as the need of a great margin, it is required to provide a dynamic range in around region A2 in FIG. 22 showing input/output characteristics of the high-frequency amplifier. However, when the peak suppression of a multicarrier signal is sufficient, it is possible to operate the high-frequency amplifier in around A1, and it is thus possible to prevent power efficiency in the high-frequency power amplifier from deteriorating.

Further, when HSDPA in W-CDMA is applied by using the technique of the adaptive peak limiter, that is, when stricter control is required since modulation schemes are switched adaptively, it is possible to achieve both the peak limit and signal quality.

Furthermore, since the distortion compensation with high accuracy is carried out in the hybrid distortion compensating circuit, it is possible to assure the quality with a desired level in transmission signal.

In this way, it is possible to implement next-generation mobile communications conforming to specifications of 3GPP.

While the W-CDMA communication system is described as an example in the foregoing, the present invention is applicable to other communication systems. For example, the peak limiter of the present invention is applicable to other CDMA communication systems that support high speed packet transmission.

Thus, in the present invention, with respect to techniques of limiting a peak and compensating for a distortion that are inevitable in transmission circuitry in CDMA systems (including the W-CDMA system), by taking realistic measures in consideration of implementing high speed data packet transmission and others, it is possible to achieve, for example, High Speed Downlink Packet Access (HSDPA) in the W-CDMA system, while clearing up strict constrains imposed on mobile communication apparatuses.

The present invention is not limited to the above described embodiments, and various variations and modifications may be possible without departing from the scope of the present invention.

This application is based on the Japanese Patent Application No. 2002-224221 filed on Jul. 31, 2002, entire content of which is expressly incorporated by reference herein.

What is claimed is:

1. An adaptive peak limiter comprising: a plurality of hard limiters which is provided respectively for a plurality of frequency channels having a possibility of containing communication data to which a predetermined data packet transmission scheme is applied, and limits an amplitude value of a baseband signal of each of the frequency channels using an adaptive limit value provided from outside; and a limit value table to which access is made using, as an address variable, on/off bit information indicative of whether the predetermined data packet transmission scheme is applied and another on/off bit information indicative of whether each of the frequency channel is used, both the information being reported from an upper layer for each of the frequency channels, and which outputs an adaptive limit value as a result of the access to provide to at least one of the plurality of hard limiters.

2. The adaptive peak limiter according to claim 1, wherein the predetermined data packet transmission scheme is a High Speed Downlink Packet Access (HSDPA) scheme conforming to IMT 2000.

3. The adaptive peak limiter according to claim 2, wherein the limit value is set in such a manner that a greater limit value is applied to a frequency channel that uses HSDPA than a frequency channel that does not use HSDPA, and that in a case where an unused frequency channel is present, as the number of unused frequency channels is increased, the limit value for use in a used frequency channel is increased.

4. A baseband signal processing LSI wherein respective signals of the frequency channels output from the adaptive peak limiter according to claim 1 are input to the multicarrier transmission signal generating circuit with peak suppressing function comprising a regular signal processing route for branching each of baseband signals corresponding to each of frequency channels to multicarrier-transmit to two signal sequences, delaying each of baseband signals in one signal sequence in a delayer, multiplying each of the signals by a correction value for peak suppression in a multiplier. performing n-time (n is an integer of two or more) interpolation processing on each of the signals multiplied by the correction value. performing filtering processing on the signals using a filter. multiplying each of the signals by a carrier to obtain single-carrier signals, and combining the single-carrier signals to output a multicarrier transmission signal; and a correction value generating route for performing on each of baseband signals in the other signal sequence substantially the same processing at substantially the same timing as the n-time interpolation processing, the filtering processing, and processing of multiplying by the carrier to obtain a single-carrier signal in the regular signal processing route, thereby obtaining a multicarrier signal for use in calculating the correction value, detecting an instantaneous peak of the multicarrier signal for use in calculating the correction value, and obtaining the correction value for peak suppression based on the detection value to provide to the multiplier in the regular signal processing route, thereby generating a multicarrier transmission signal subjected to peak suppressing processing such that a PAR (Peak to Average Ratio) value and a CCDF (Complementary Cumulative Distribution Function) remain within respective desired allowable ranges.

5. A CDMA multicarrier transmission apparatus mounted with the baseband signal processing LSI according to claim 4.

6. A CDMA multicarrier transmission apparatus comprising: the baseband signal processing LSI according to claim 4; and a digital-controlled hybrid distortion compensating circuit that performs both pre-distortion processing and feedforward distortion canceling processing.

* * * * *